United States Patent
Kim et al.

(10) Patent No.: US 8,443,199 B2
(45) Date of Patent: May 14, 2013

(54) MOBILE TERMINAL AND METHOD OF CONTROLLING THE MOBILE TERMINAL

(75) Inventors: Jong Hwan Kim, Seoul (KR); Byung Eun Bong, Seoul (KR)

(73) Assignee: LG Electronics, Inc., Seoul (KR)

( * ) Notice: Subject to any disclaimer, the term of this patent is extended or adjusted under 35 U.S.C. 154(b) by 388 days.

(21) Appl. No.: 12/727,197

(22) Filed: Mar. 18, 2010

(65) Prior Publication Data

US 2010/0240415 A1    Sep. 23, 2010

(30) Foreign Application Priority Data

Mar. 18, 2009 (KR) .................. 10-2009-0023211
Mar. 9, 2010 (KR) .................. 10-2010-0020866

(51) Int. Cl.
*H04L 29/06* (2006.01)

(52) U.S. Cl.
USPC ........................ 713/182; 455/565; 345/173

(58) Field of Classification Search ............ 713/182
See application file for complete search history.

(56) References Cited

U.S. PATENT DOCUMENTS

| | | | | |
|---|---|---|---|---|
| 7,280,677 | B2 * | 10/2007 | Chandler et al. | 382/116 |
| 7,420,546 | B2 * | 9/2008 | Abdallah et al. | 345/173 |
| 7,697,729 | B2 * | 4/2010 | Howell et al. | 382/115 |
| 2006/0284853 | A1 | 12/2006 | Shapiro | |
| 2007/0150842 | A1 | 6/2007 | Chaudhri et al. | |

FOREIGN PATENT DOCUMENTS

| | | |
|---|---|---|
| JP | 2007-304646 A | 11/2007 |
| WO | WO 2007/140806 A1 | 12/2007 |
| WO | WO 2008/086302 A1 | 7/2008 |

OTHER PUBLICATIONS

Ahmad Ahsanullah et al. "Research Design for Evaluation of Finger Input Properties on Multi-touch Screen." International Conference on Information and Communication Technologies (ICICT), Jul. 23-24, 2011 (pp. 1-6).*

* cited by examiner

*Primary Examiner* — Taghi Arani
*Assistant Examiner* — Narciso Victoria
(74) *Attorney, Agent, or Firm* — Birch, Stewart, Kolasch & Birch, LLP

(57) ABSTRACT

A mobile terminal and a method of controlling the mobile terminal are provided. The method includes storing a plurality of pieces of fingerprint information on at least one of a finger-by-finger basis, a user-by-user basis, and a pattern-by-pattern basis; receiving a fingerprint-touch input through a display module capable of performing fingerprint identification; and if fingerprint information of the received fingerprint-touch input matches with one of the plurality of pieces of fingerprint information for locking a predefined operating menu, locking the predefined operating menu. Therefore, it is possible to easily lock or unlock the mobile terminal in response to a fingerprint-touch input. In addition, it is possible to effectively perform various operations performed by the mobile terminal in response to a fingerprint-touch input.

18 Claims, 33 Drawing Sheets

FIG. 4
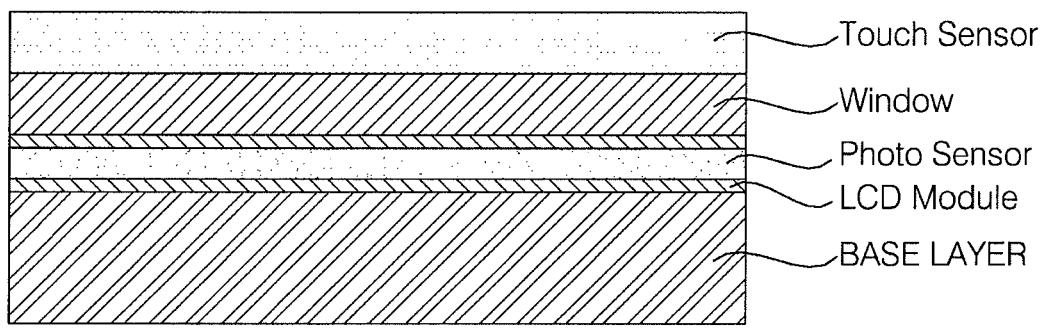
(a)
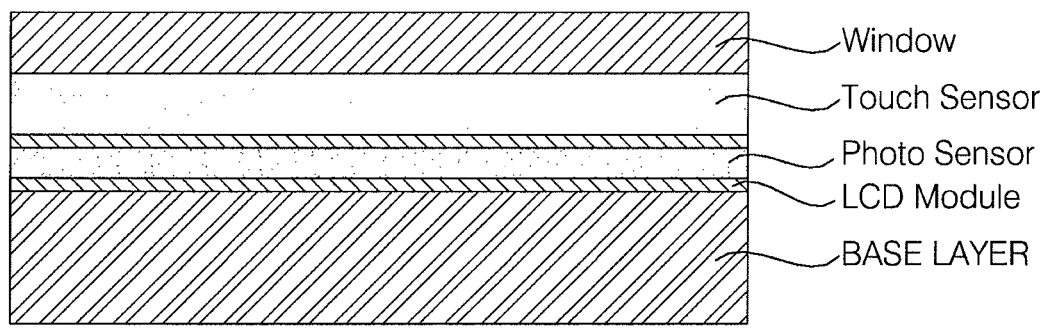
(b)

FIG. 5
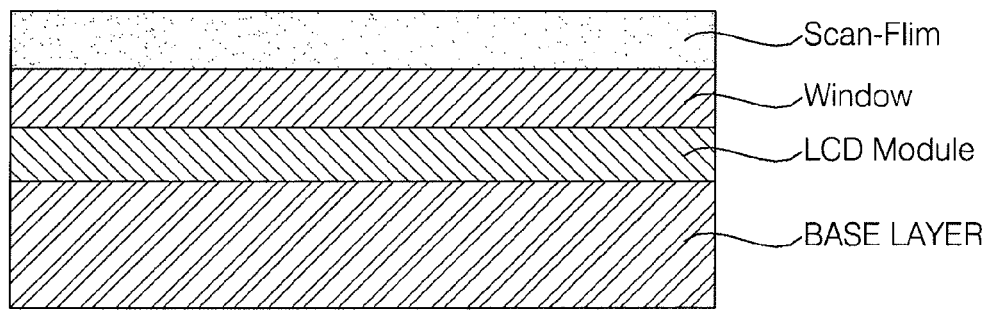
(a)
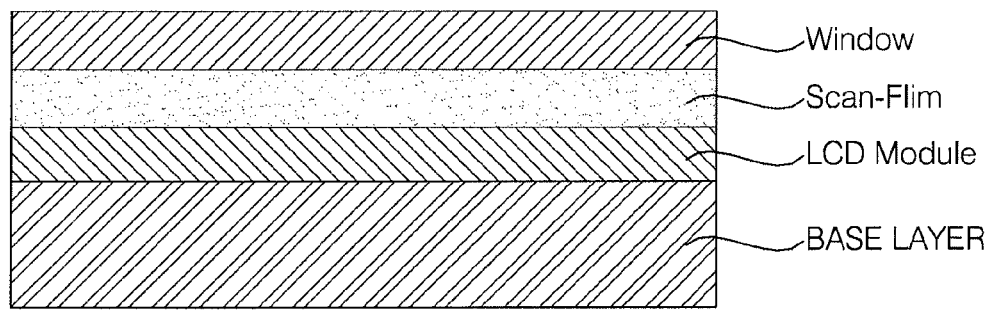
(b)

FIG. 8

|    | R1   | R2  | R3  | ... | Rn |
|----|------|-----|-----|-----|-----|
| Red | 100% | 50% | 20% | •   | •   |
| Green | 50% | 20% | •   | •   | •   |
| Blue | 0%  | 10% | 0%  | •   | ••  |

(a)   (b)

(a)          (b)

FIG. 21
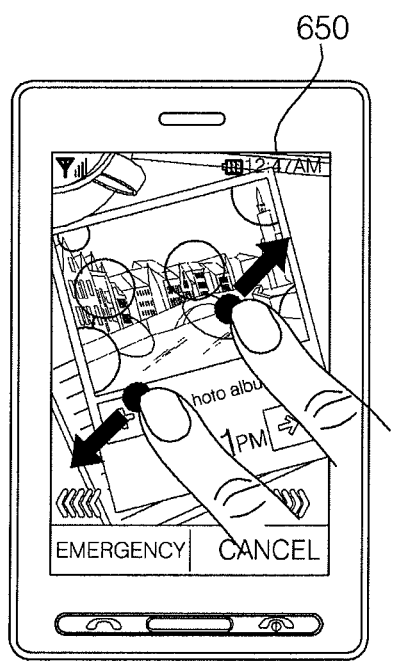 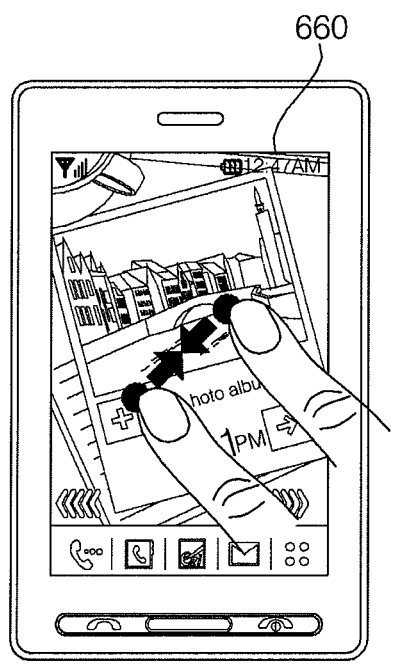
(a)            (b)

| FINGERPRINT TOUCH | SCROLL SPEED/ACCELERATION |
|---|---|
| USER1 | VERY LOW |
| USER2 | LOW |
| USER3 | NORMAL |
| USER4 | HIGH |
| USER5 | VERY HIGH |

(b)

| FINGERPRINT TOUCH | SCROLL SPEED/ACCELERATION |
|---|---|
| THUMB | VERY LOW |
| INDEX FINGER | LOW |
| MIDDLE FINGER | NORMAL |
| RING FINGER | HIGH |
| LITTLE FINGER | VERY HIGH |

(c)

| FINGERPRINT TOUCH | SCROLL SPEED/ACCELERATION |
|---|---|
| PATTERN1 | VERY LOW |
| PATTERN2 | LOW |
| PATTERN3 | NORMAL |
| PATTERN4 | HIGH |
| PATTERN5 | VERY HIGH |

| FINGERPRINT TOUCH | SCROLL SPEED/ACCELERATION |
|---|---|
| USER1 | 1 SCREEN BASIS |
| USER2 | 2 SCREEN BASIS |
| USER3 | 3 SCREEN BASIS |
| USER4 | 4 SCREEN BASIS |
| USER5 | 5 SCREEN BASIS |

(b)

| FINGERPRINT TOUCH | SCROLL SPEED/ACCELERATION |
|---|---|
| THUMB | 1 LINE BASIS |
| INDEX FINGER | 2 LINE BASIS |
| MIDDLE FINGER | 3 LINE BASIS |
| RING FINGER | 4 LINE BASIS |
| LITTLE FINGER | 5 LINE BASIS |

(c)

| FINGERPRINT TOUCH | SCROLL SPEED/ACCELERATION |
|---|---|
| PATTERN1 | 1 PAGE BASIS |
| PATTERN2 | 2 PAGE BASIS |
| PATTERN3 | 3 PAGE BASIS |
| PATTERN4 | 4 PAGE BASIS |
| PATTERN5 | 5 PAGE BASIS |

(a)            (b)

(a)                  (b)

MOBILE TERMINAL AND METHOD OF CONTROLLING THE MOBILE TERMINAL

CROSS-REFERENCE TO RELATED APPLICATION

This application claims the priority benefit of Korean Patent Application No. 10-2009-0023211, filed on Mar. 18, 2009 and Korean Patent Application No. 10-2010-0020866, filed on Mar. 9, 2010 in the Korean Intellectual Property Office, the disclosure of which is incorporated herein by reference.

BACKGROUND OF THE INVENTION

1. Field of the Invention

The present invention relates to a mobile terminal and a method of controlling the mobile terminal, and more particularly, to a mobile terminal and a method of controlling the mobile terminal, in which various operations performed by the mobile terminal can be effectively controlled in response to a fingerprint-touch input having fingerprint information.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for the installation of a UI such as a display or a keypad without compromising the mobility and the portability of the mobile terminal. Therefore, it is necessary to develop ways to control the operation of a mobile terminal using a new data input method and thus use various complicated functions provided by the mobile terminal with convenience.

SUMMARY OF THE INVENTION

The present invention provides a mobile terminal and a method of controlling the mobile terminal, in which various operations performed by the mobile terminal can be effectively controlled in response to a fingerprint-touch input having fingerprint information.

According to an aspect of the present invention, there is provided a method of controlling a mobile terminal, the method including storing a plurality of pieces of fingerprint information on at least one of a finger-by-finger basis, a user-by-user basis, and a pattern-by-pattern basis; receiving a fingerprint-touch input through a display module capable of performing fingerprint identification; and if fingerprint information of the received fingerprint-touch input matches with one of the plurality of pieces of fingerprint information for locking a predefined operating menu, locking the predefined operating menu.

According to another aspect of the present invention, there is provided a mobile terminal including a display module configured to be capable of performing fingerprint identification; a memory configured to store a plurality of pieces of fingerprint information on at least one of a finger-by-finger basis, a user-by-user basis, and a pattern-by-pattern basis; and a controller configured to receive a fingerprint-touch input through the display module, wherein, if fingerprint information of the received fingerprint-touch input matches with one of the plurality of pieces of fingerprint information for locking a predefined operating menu, the controller locks the predefined operating menu.

According to another aspect of the present invention, there is provided a method of controlling a mobile terminal, the method including storing a plurality of pieces of fingerprint information on at least one of a finger-by-finger basis, a user-by-user basis, and a pattern-by-pattern basis; displaying an operation screen on a display module capable of performing fingerprint identification; receiving a fingerprint-touch input through the display module; and if fingerprint information of the received fingerprint-touch input matches with one of the plurality of pieces of fingerprint information for controlling the display of a screen, controlling the display of the operation screen in accordance with a control value corresponding to the fingerprint information that matches with the fingerprint information of the received fingerprint-touch input.

According to another aspect of the present invention, there is provided a mobile terminal including a display module configured to be capable of performing fingerprint identification and display an operation screen; a memory configured to store a plurality of pieces of fingerprint information on at least one of a finger-by-finger basis, a user-by-user basis, and a pattern-by-pattern basis; and a controller configured to receive a fingerprint-touch input through the display module, wherein, if fingerprint information of the received fingerprint-touch input matches with one of the plurality of pieces of fingerprint information for controlling the display of a screen, the controller controls the display of the operation screen in accordance with a control value corresponding to the fingerprint information that matches with the fingerprint information of the received fingerprint-touch input.

According to another aspect of the present invention, there is provided a method of controlling a mobile terminal, the method including locking a predefined operating mode; receiving a fingerprint-touch input through a display module capable of performing fingerprint identification; and if fingerprint information of the received fingerprint-touch input matches with one of a plurality of pieces of previously-stored fingerprint information for unlocking the predefined operating mode, unlocking the predefined operating mode and entering an operating mode corresponding to the fingerprint information that matches with the fingerprint information of the received fingerprint-touch input.

According to another aspect of the present invention, there is provided a mobile terminal including a display module configured to be capable of performing fingerprint identification; a memory configured to store a plurality of pieces of fingerprint information; and a controller configured to receive a fingerprint-touch input through the display module, wherein, if fingerprint information of the received fingerprint-touch input matches with one of a plurality of pieces of previously-stored fingerprint information for unlocking the predefined operating mode, the controller unlocks the predefined operating mode and enters an operating mode corresponding to the fingerprint information that matches with the fingerprint information of the received fingerprint-touch input.

According to another aspect of the present invention, there is provided a method of controlling a mobile terminal, the method including storing a plurality of pieces of fingerprint information on at least one of a finger-by-finger basis, a user-by-user basis, and a pattern-by-pattern basis; displaying a first screen showing a number of menu icons on a display module capable of performing fingerprint identification; receiving a fingerprint-touch input through the display module; and if fingerprint information of the received fingerprint-touch input matches with one of the plurality of pieces of fingerprint information, displaying a second screen showing a predefined group of menu icons corresponding to the fingerprint information that matches with the fingerprint information of the received fingerprint-touch input.

According to another aspect of the present invention, there is provided a mobile terminal including a display module configured to be capable of performing fingerprint identification and display a first screen showing a number of menu icons; a memory configured to store a plurality of pieces of fingerprint information on at least one of a finger-by-finger basis, a user-by-user basis, and a pattern-by-pattern basis; and a controller configured to receive a fingerprint-touch input through the display module, wherein, if fingerprint information of the received fingerprint-touch input matches with one of the plurality of pieces of fingerprint information, the controller displays a second screen showing a predefined group of menu icons corresponding to the fingerprint information that matches with the fingerprint information of the received fingerprint-touch input.

BRIEF DESCRIPTION OF THE DRAWINGS

The above and other features and advantages of the present invention will become more apparent by describing in detail preferred embodiments thereof with reference to the attached drawings in which:

Figure 8:
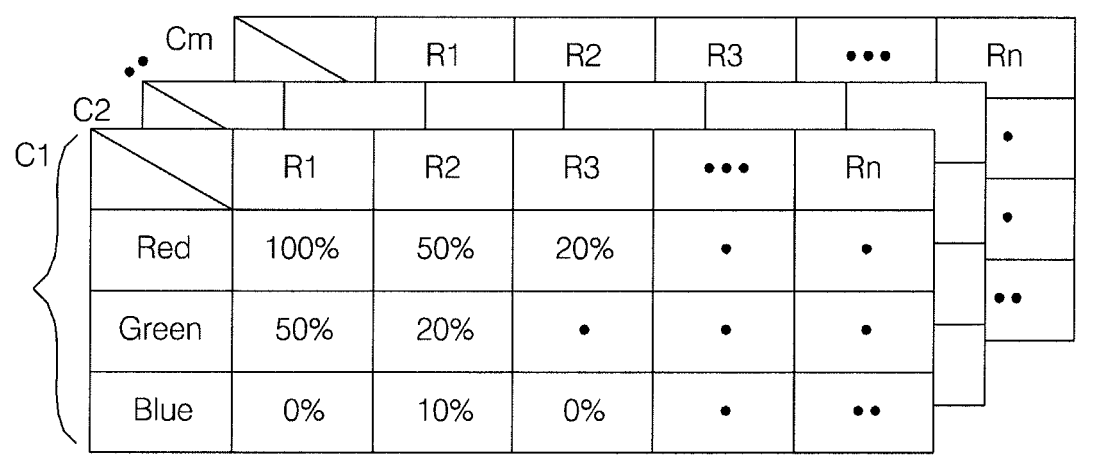

FIGS. 4 through 8 illustrate the structure of a display module capable of identifying a fingerprint, which can be used in the mobile terminal shown in FIG. 1;

FIGS. 17 through 21 illustrate how to lock or unlock a mobile terminal in response to a fingerprint-touch input;

FIGS. 22 through 30 illustrate how to control a screen in response to a fingerprint-touch input;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
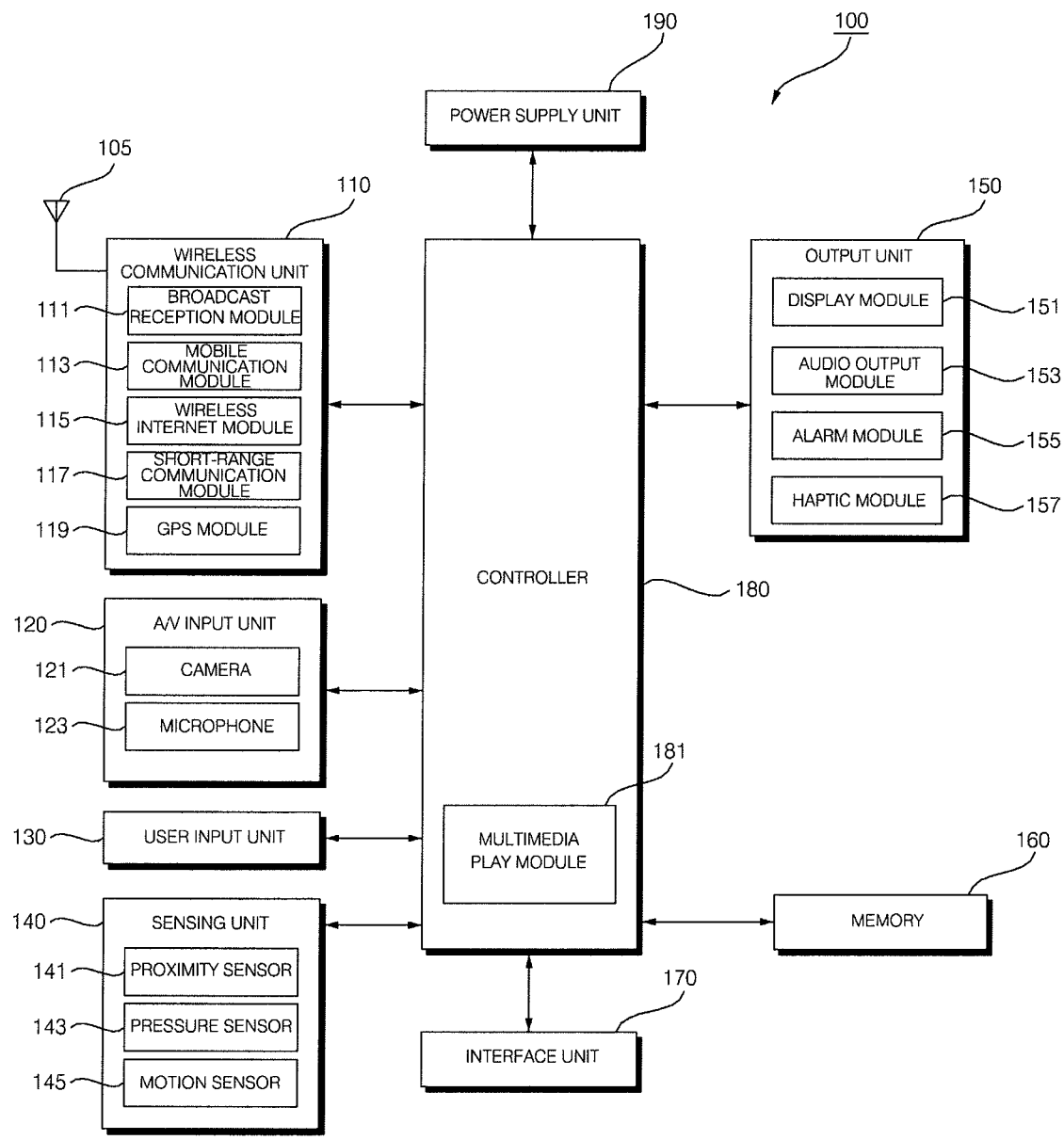
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG)

of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180.

Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a slider-type mobile terminal. Rather, the present invention can be applied to various mobile phones, other than a slider-type mobile terminal.

Figure 2:
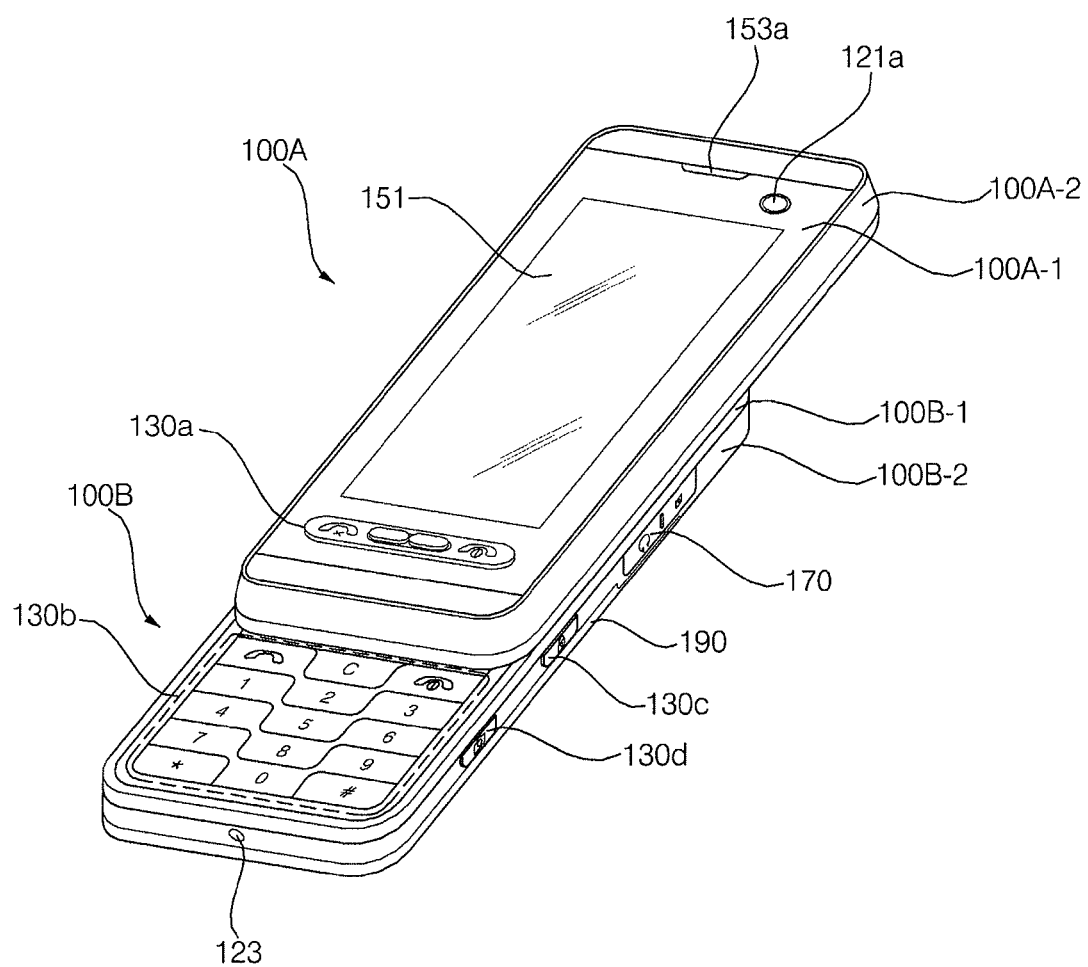
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first audio output module 153a, a first camera 121a and a first user input unit 130a may be disposed in the front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The exterior of the second body 100B may be defined by a second front case 100B-1 and a second rear case 100B-2. A second user input unit 130b may be disposed in the second body 100B, and particularly, at the front of the second front case 100B-1. Third and fourth user input units 130c and 130d, the microphone 123 and the interface unit 170 may be provided in the second front case 100B-1 or the second rear case 100B-2.

The first through fourth user input units 130a through 130d and fifth and sixth user input units 130e and 130f may be collectively referred to as the user input unit 130. The user input unit 130 may adopt various manipulation methods as long as it can offer tactile feedback to the user.

The first user input unit 130a may allow the user to input various commands such as 'start', 'end', and 'scroll' to the mobile terminal 100, the second user input unit 130b may be used to input various numerals, characters or symbols, and the third and fourth user input units 130c and 130d may be used as hot keys for activating certain functions of the mobile terminal 100.

The microphone 123 may be configured to properly receive the user's voice or other sounds.

Figure 3:
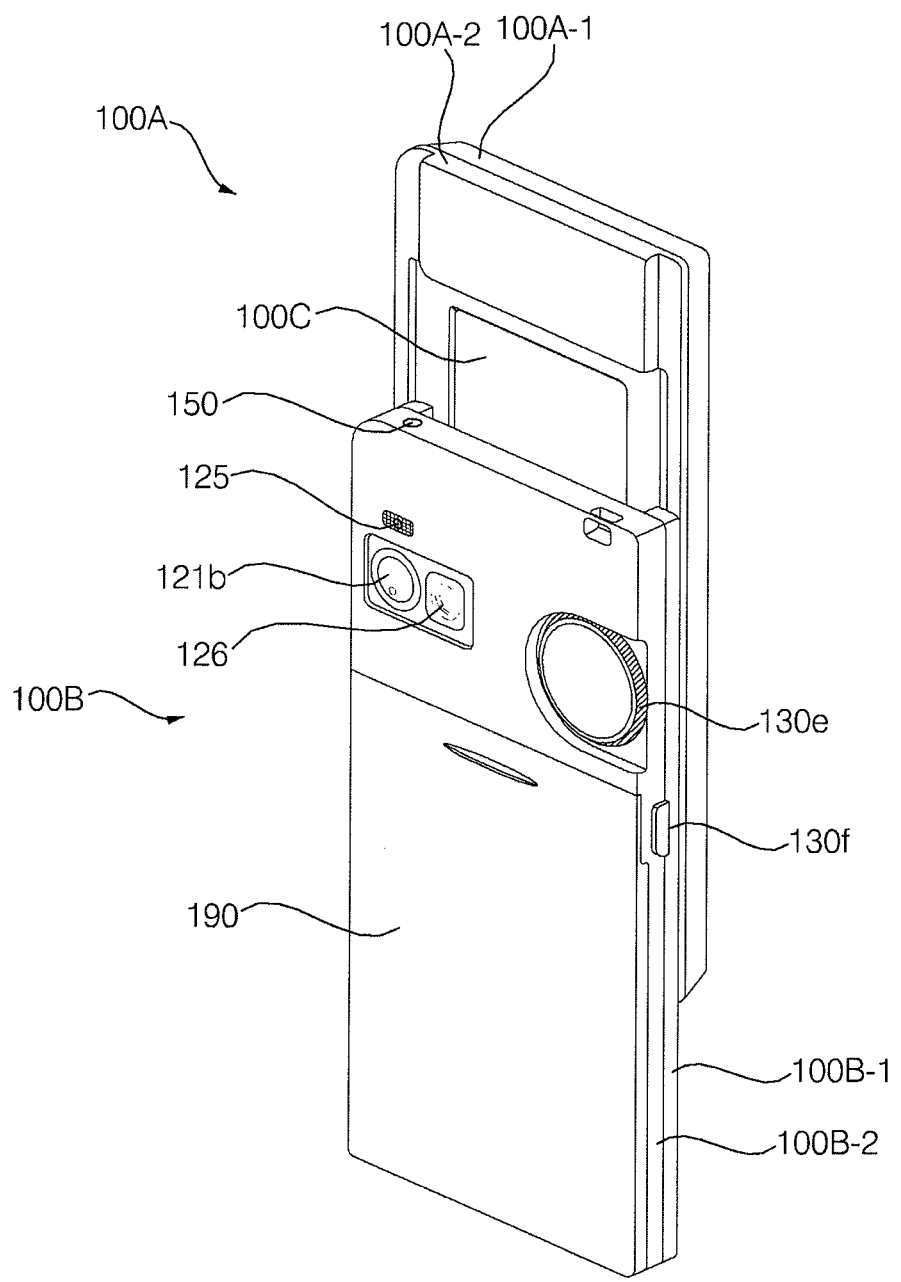
FIG. 3 illustrates a rear perspective view of the mobile terminal shown in FIG. 1.
Figure 6:
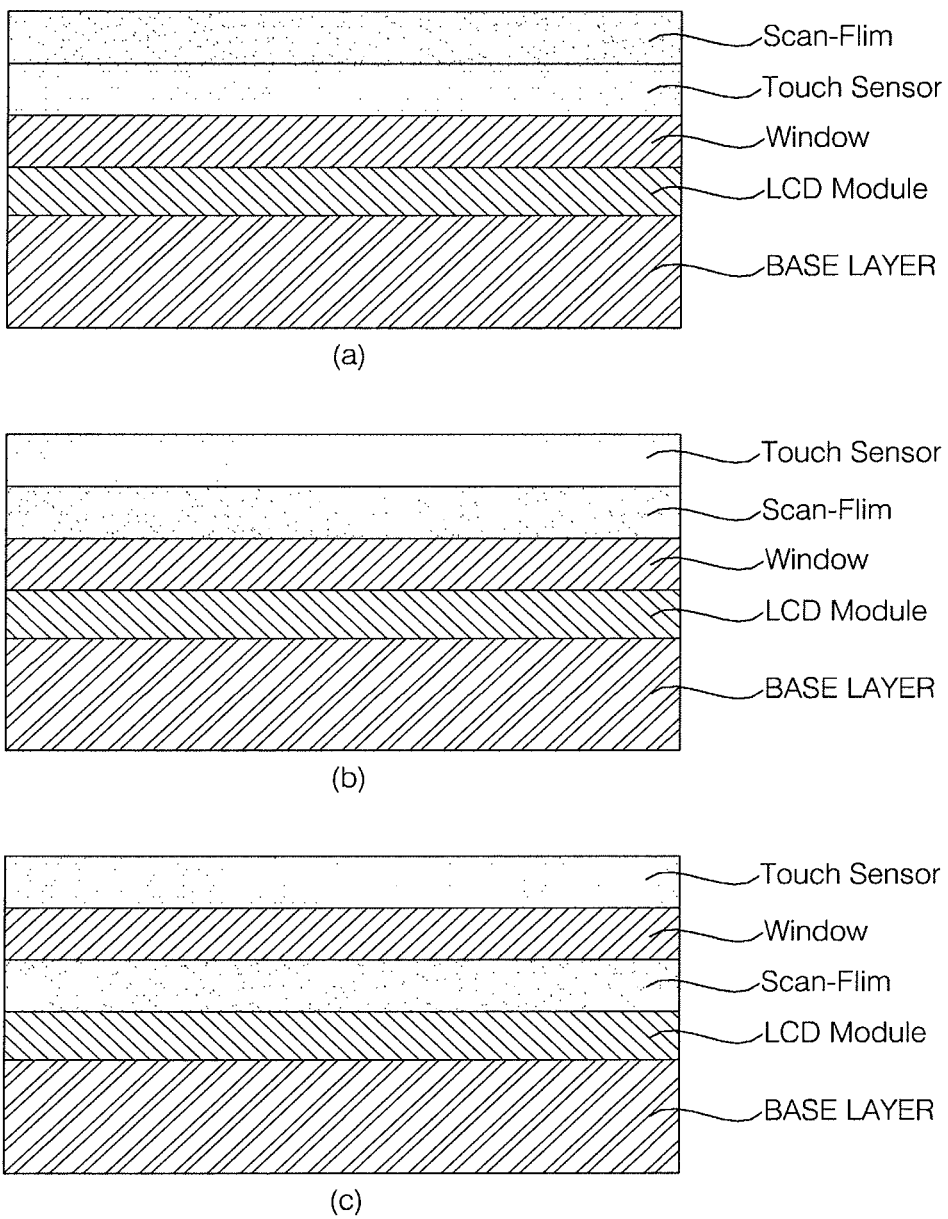

FIG. 3 illustrates a rear perspective view of the mobile terminal 100 shown in FIG. 2. Referring to FIG. 3, the fifth user input unit 130e, which is of a wheel type, and the second camera 121b may be disposed at the rear of the second rear case 100B-2 of the second body 100B, and a sixth user input unit 130f may be disposed on one side of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A camera flash 125 and a mirror 126 may be disposed near the second camera 121b. The camera flash 125 may be used to illuminate a subject when the user attempts to capture an image of the subject with the second camera 121b. The mirror 126 may be used for the user to prepare him- or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for receiving a broadcast signal may be disposed on one side of the second rear case 100B-2. The antenna may be installed so as to be able to be pulled out of the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden from view by the second front case 100B-1 of the second body 100B, and thus may not be exposed.

The second camera 121b and the other elements that have been described as being provided on the rear case 100A-2 may be provided on the front case 100A-1. In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

FIGS. 4 through 8 illustrate the structure of the display module 151, which is capable of identifying a fingerprint. A touch input made by placing a pointer such as a pen in contact with the surface of the display module 151 will hereinafter be referred to as an ordinary touch input, and a touch input made by placing the user's finger in contact with the surface of the display module 151 so as to provide fingerprint information will hereinafter be referred to as a fingerprint-touch input.

In order to generate a fingerprint-touch input, the display module 151 may need to be configured to be able to identify a fingerprint. For this, the display module 151 may include an LCD module with a photo sensor embedded therein or an LCD module covered with a scan film with a photo sensor.

Referring to FIGS. 4(a) and 4(b), the display module 151 may include an LCD module having a photo sensor embedded therein. A touch sensor may be disposed on the top or bottom of a window. More specifically, the display module 151 may include a stack of a base layer, an LCD module, a photo sensor, a window, and a touch sensor, as shown in FIG. 4(a), or may include a stack of the base layer, the LCD module, the photo sensor, the touch sensor and the window, as shown in FIG. 4(b).

The display module 151 may also be configured, without using the touch sensor, to be able to identify a fingerprint by using a scan structure of the photo sensor. In this case, the display module 151 may include a stack of the base layer, the LCD module, the photo sensor and the window.

Alternatively, referring to FIGS. 5(a) through 6(c), the display module 151 may include an LCD module covered with a scan film having a photo sensor. More specifically, the display module 151 may include a stack of a base layer, an LCD module, a window and a transparent scan film, as shown in FIG. 5(a), or may include a stack of the base layer, the LCD module, the transparent scan film and the window, as shown in FIG. 5(b).

Referring to FIGS. 6(a) through 6(c), the display module 151 may include both a scan film and a touch sensor. More specifically, the display module 151 may include a stack of a base layer, an LCD module, a window, the touch sensor and the scan film, as shown in FIG. 6(a), may include a stack of the base layer, the LCD module, the window, the scan film and the touch sensor, as shown in FIG. 6(b), or may include a stack of the base layer, the LCD module, the scan film, the window, and the touch sensor, as shown in FIG. 6(c).

The touch sensor may be disposed at the top or bottom of the window. Thus, the display module 151 may have a structure in which the base layer, the LCD module, the touch sensor, the window and the scan film are sequentially deposited, a structure in which the base layer, the LCD module, the touch sensor, the photo sensor and the window are sequentially deposited, or a structure in which the base layer, the LCD module, the photo sensor, the touch sensor and the window are sequentially deposited.

Figure 7:
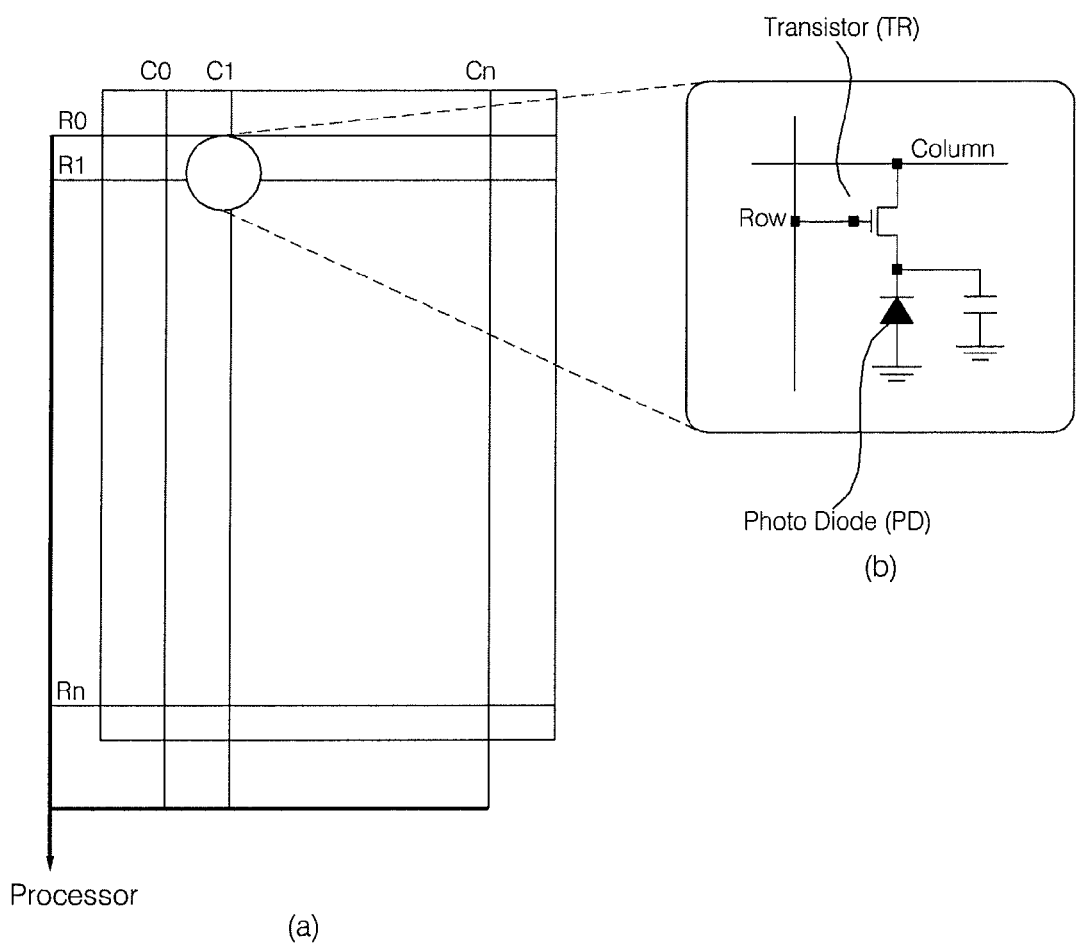

Referring to FIG. 7, a scan film may include a transparent film, which is formed of a transparent material such as glass, and a plurality of photodiodes PD and a plurality of transistors TR, which are mounted on the transparent film and are disposed at the intersections of a plurality of rows $R_0$ through $R_n$ and a plurality of columns $C_0$ through $C_n$ on the transparent film. Thus, the scan film may be able to scan any object placed thereon by using an electric signal whose level varies according to the amount of light applied to the photodiodes.

It is possible to perform a black-and-white scan operation including fingerprint identification by using a basic scan function of the scan film. In addition, it is possible to perform a color scan operation. In addition, it is possible to perform a color scan operation by combining light reflected from each pixel of the LCD module at the rear of the display module 151. In this case, the amount of red, green or blue light reflected from each pixel of the LCD module may be calculated using tables shown in FIG. 8, and red, green and blue light may be combined based on the results of the calculation. However, the present invention is not restricted to this. That is, various matrices or functions, other than the tables shown in FIG. 8, may be used to combine red, green and blue light.

Since the display module 151 can calculate coordinates based on a variation in the amount of light by using a photo sensor, the display module 151 not only can perform a scan operation but also can serve as an input device capable of receiving various types of touch inputs such as a single- or a multi-touch input.

As described above, the display module 151 may be able not only to perform a scan operation but also to receive various types of touch inputs by using a scan structure of a photo sensor without a requirement of a touch sensor. When no touch sensor is used in the display module 151, the manufacturing cost of the display module 151 can be reduced. On the other hand, when a touch sensor is used in the display module 151, the recognition of a touch input can be stabilized. The display module 151 has been described above as identifying a fingerprint using a photo sensor, but the present invention is not restricted to this. That is, the display module 151 may identify a fingerprint using various methods other than using a photo sensor.

Figure 9A:
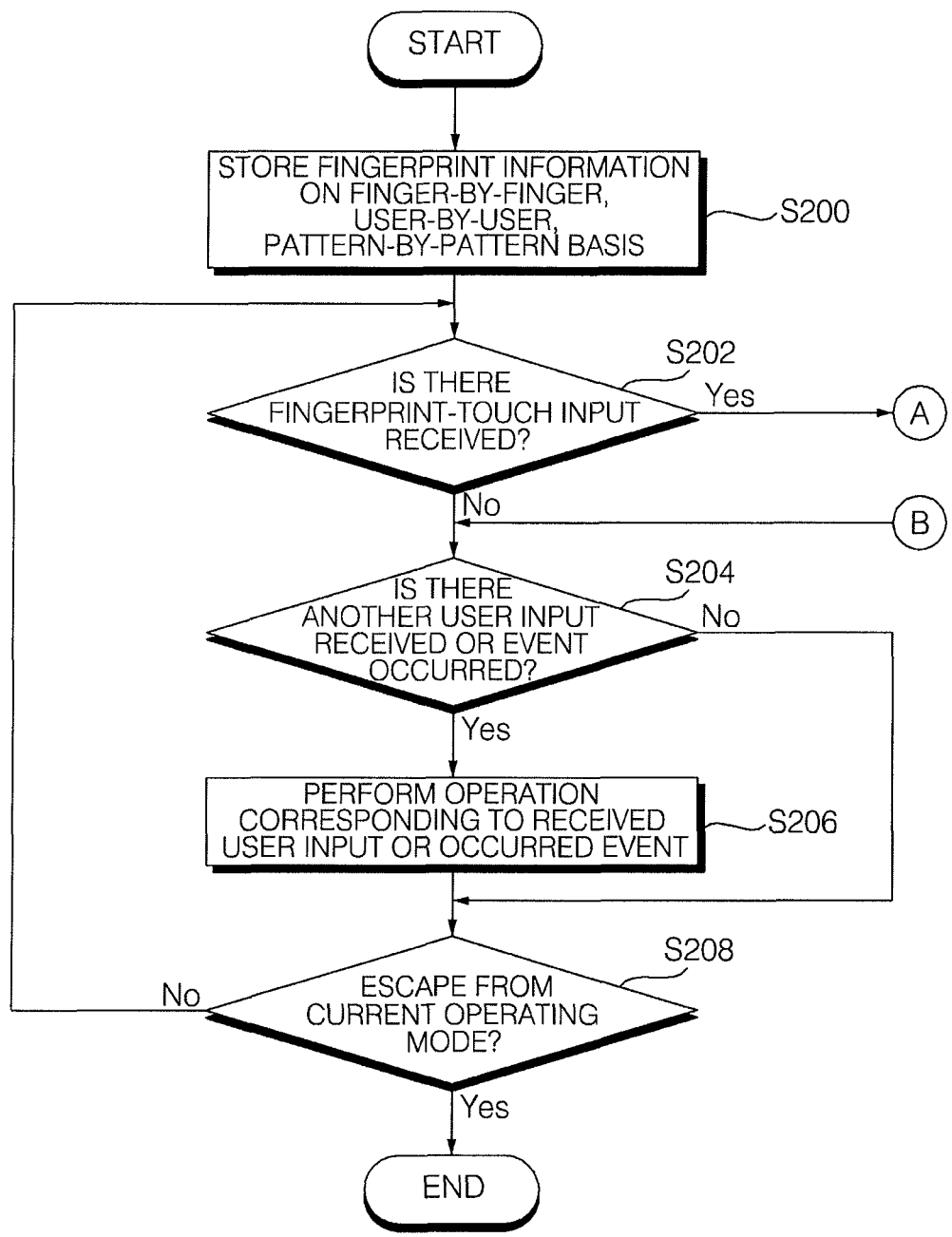
FIGS. 9A and 9B illustrate flowcharts of a method of controlling a mobile terminal according to a first exemplary embodiment of the present invention.
Figure 9B:
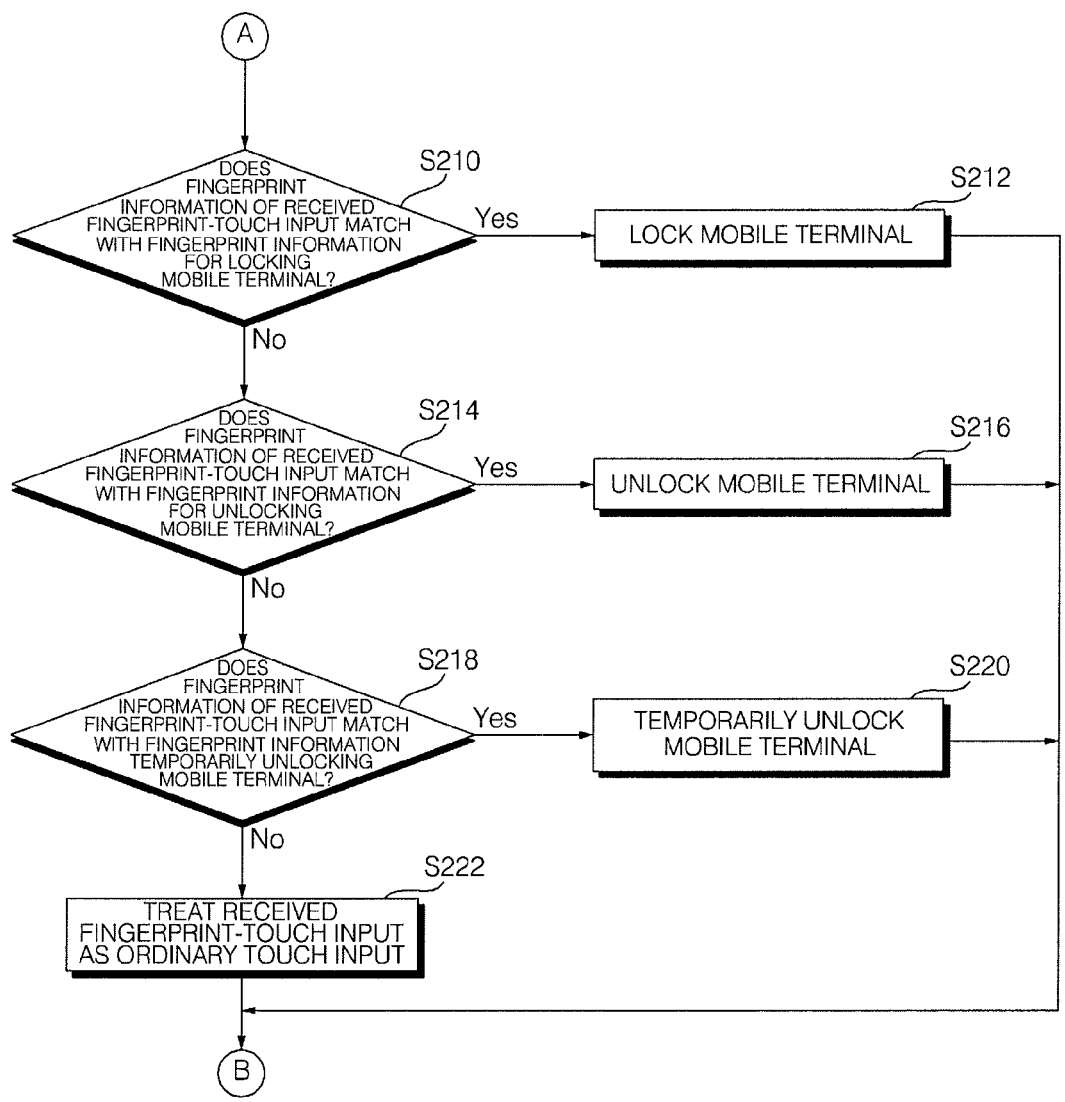

FIGS. 9A and 9B illustrate flowcharts of a method of controlling a mobile terminal according to a first exemplary embodiment of the present invention. Referring to FIG. 9A, a plurality of pieces of fingerprint information may be stored in the memory 160 on a finger-by-finger basis, on a user-by-user basis and/or on a pattern-by-pattern basis (S200). More specifically, the plurality of pieces of fingerprint information may include fingerprints acquired from different fingers of an individual or fingerprints acquired from different individuals. Alternatively, the plurality of pieces of fingerprint information may include fingerprints having different patterns in consideration that fingerprints acquired even from the same finger can often appear different due to variations in the degree to which, and the pressure with which the finger is brought into contact with the display module 151.

The plurality of pieces of fingerprint information may be stored along with the descriptions of operating menus or operations that can be performed in association with the plurality of pieces of fingerprint information such as locking or unlocking the mobile terminal 100.

Thereafter, the controller 180 may determine whether there is a fingerprint-touch input received through the display module 151 (S202). A fingerprint-touch input is a touch input generated by touching the display module 151 with a finger and thus includes fingerprint information. If it is determined in operation S202 that there is a fingerprint-touch input received through the display module 151, the method proceeds to operation S210 of FIG. 9B.

If there is a user input, other than a fingerprint-touch input, received or an event occurred (S204), the controller 180 may control an operation corresponding to the received user input or the occurred event to be performed (S206). Operations S202 through S206 may be repeatedly performed until the user chooses to escape from a current operating mode (S208).

Referring to FIG. 9B, if it is determined in operation S202 that there is a fingerprint-touch input received through the display module 151, the controller 180 may determine whether fingerprint information of the received fingerprint-touch input matches with previously-stored fingerprint information for locking the mobile terminal 100 (S210). If the fingerprint information of the received fingerprint-touch input matches with previously-stored fingerprint information for locking the mobile terminal 100, the controller 180 may lock the current operating menu (S212).

When the mobile terminal 100 is locked, the mobile terminal 100 does not respond to any type of user input. The mobile terminal 100 may be locked for all operating menus or only for a certain operating menu such as making a call, accessing the interne, or protecting privacy. If the mobile terminal 100 is locked, an icon may be displayed, or a sound effect or a haptic effect may be generated in order to alert the user.

If the fingerprint information of the received fingerprint-touch input matches with previously-stored fingerprint information for unlocking the mobile terminal 100 (S214), the controller 180 may unlock the mobile terminal (S216). If the fingerprint information of the received fingerprint-touch input matches with previously-stored fingerprint information for temporarily unlocking the mobile terminal 100 (S218), the controller 180 may temporarily unlock the mobile terminal 100 (S220). If the mobile terminal 100 is unlocked regardless of permanently or temporarily, a sound effect or a haptic effect may be generated in order to alert the user.

If the fingerprint information of the received fingerprint-touch input does not match with any one of the previously-stored fingerprint information for locking the mobile terminal 100, the previously-stored fingerprint information for unlocking the mobile terminal 100 and the previously-stored fingerprint information for temporarily unlocking the mobile terminal 100, the controller 180 may control the received fingerprint-touch input to be treated as an ordinary touch input (S222), and the method returns to operation S204.

In this manner, it is possible to lock or unlock the mobile terminal 100 for various operating menus in accordance with fingerprint information of a received fingerprint-touch input. In the first exemplary embodiment, the mobile terminal 100 may be unlocked in response to a fingerprint-touch input. However, the present invention is not restricted to this. That is, the mobile terminal 100 may be unlocked by entering a password. In this case, a menu for entering the password may be additionally provided.

Alternatively, the mobile terminal 100 may be configured to be locked or unlocked if a fingerprint-touch input is detected from a certain part of the display module 151 or is detected for more than a predefined amount of time. Still alternatively, the mobile terminal 100 may be configured to be locked or unlocked in response to an accelerated fingerprint-touch input, which is generated by touching the display module 151 quickly compared to the case of generating a typical fingerprint-touch input, a pressure fingerprint-touch input, which is generated by touching the display module 151 with pressure.

Still alternatively, the mobile terminal 100 may be configured to be locked or unlocked in response to a complex fingerprint-touch input, which is generated by, for example, fingerprint-touching the display module 151 with a finger and then dragging the finger toward a certain direction, sequentially touching a first point and a second point on the display module 151 in a row within a predefined amount of time, touching the first point with a finger and then dragging the finger from the first point to the second point, touching the display module 151 with more than one finger, or fingerprint-touching the display module 151 and then dragging the finger in an L- or U-shaped motion. Still alternatively, the mobile terminal 100 may be locked or unlocked by touching the display module 151 with two or more fingers and then either pinching the fingers together or pushing the fingers apart.

Figure 10:
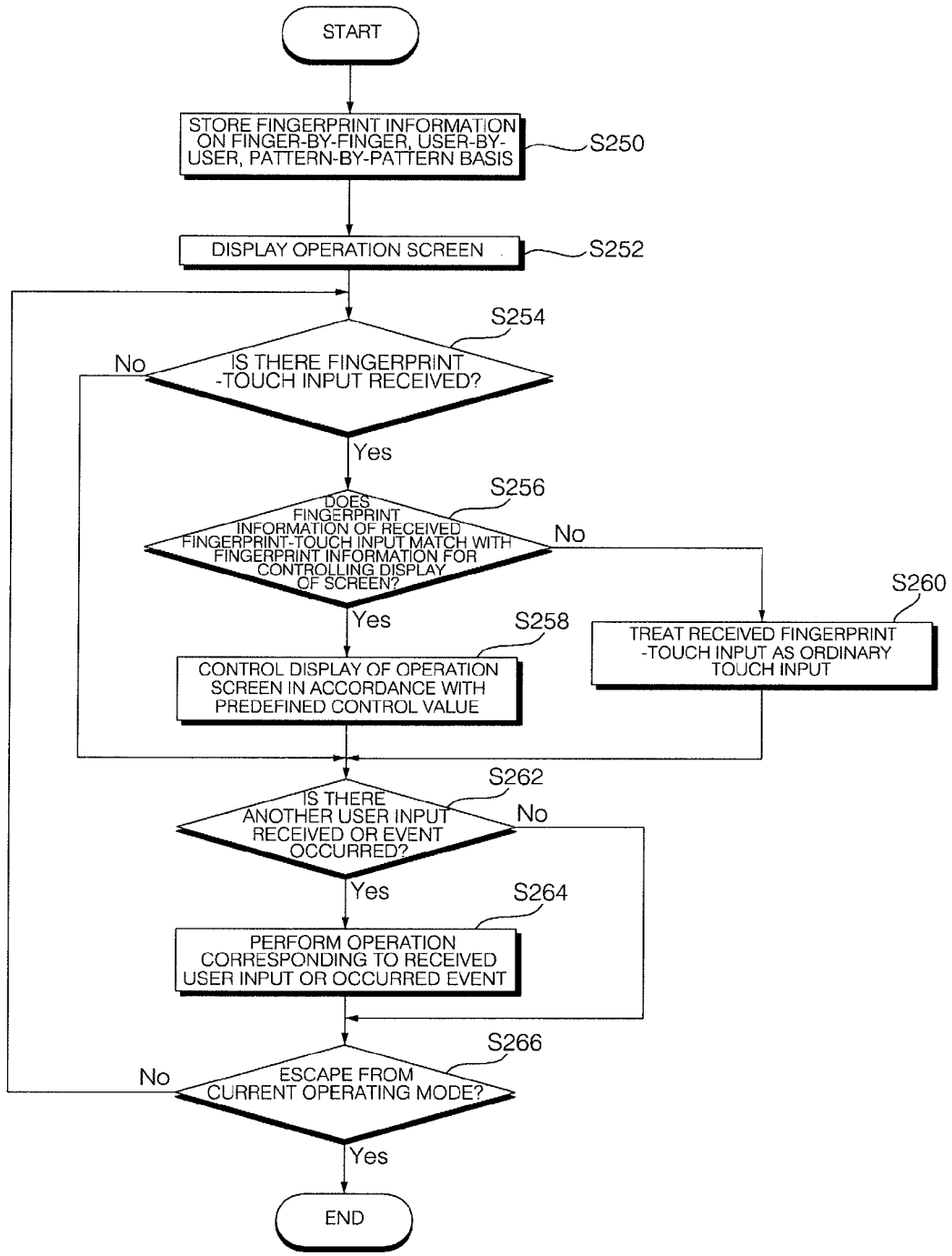
FIG. 10 illustrates a flowchart of a method of controlling a mobile terminal according to a second exemplary embodiment of the present invention.

FIG. 10 illustrates a flowchart of a method of controlling a mobile terminal according to a second exemplary embodiment of the present invention. Referring to FIG. 10, a plurality of pieces of fingerprint information may be stored in the memory 160 on a finger-by-finger basis, on a user-by-user basis and/or on a pattern-by-pattern basis (S250). More specifically, the plurality of pieces of fingerprint information may include fingerprints acquired from different fingers of an individual or fingerprints acquired from different individuals. Alternatively, the plurality of pieces of fingerprint information may include fingerprints having different patterns in consideration that fingerprints acquired even from the same finger can often appear different due to variations in the degree to which, and the pressure with which the finger is brought into contact with the display module 151.

Thereafter, the controller 180 may display an operation screen corresponding to a current menu or operation selected by the user on the display module 151 (S252). Examples of the operation screen include an idle screen, a list screen, a message reception screen, a main menu screen, a text- or image-viewer screen, a moving image screen, a broadcast screen, a map screen and a webpage screen.

Thereafter, the controller 180 may determine whether there is a fingerprint-touch input received through the display module 151 (S254). A fingerprint-touch input is a touch input generated by touching the display module 151 with a finger and thus includes fingerprint information.

Thereafter, if it is determined in operation S254 that there is a fingerprint-touch input received through the display module 151, the controller 180 may determine whether fingerprint information of the received fingerprint-touch input matches with previously-stored fingerprint information for controlling the display of a screen (S256). Thereafter, if it is determined in operation S256 that the fingerprint information of the received fingerprint-touch input matches with the previously-stored fingerprint information for controlling the display of a screen, the controller 180 may control the display of the operation screen in accordance with a control value corresponding to the previously-stored fingerprint information for controlling the display of a screen (S256). For example, the controller 180 may scroll the operation screen at a speed corresponding to the control value, may control the playback speed of the operation screen in accordance with the control value, or may move the operation screen by a distance corresponding to the control value. The control value may be set by the user for each of the plurality of pieces of fingerprint information present in the memory 160. During the control of the display of the operation screen in accordance with the control value, the controller 180 may generate a haptic effect in order to alert the user.

If there is no match for the fingerprint information of the received fingerprint-touch input in the memory 160, the controller 180 may control the received fingerprint-touch input to be treated as an ordinary touch input (S260).

If there is a user input, other than a fingerprint-touch input, received or an event occurred (S262), the controller 180 may control an operation corresponding to the received user input or the occurred event to be performed (S264). Operations S254 through S264 may be repeatedly performed until the user chooses to escape from the current menu or operation (S266).

In this manner, it is possible to scroll a screen at various speeds or control the playback speed of a screen in accordance with fingerprint information of a fingerprint-touch input.

More specifically, the control of the display of a screen in response to a fingerprint-touch input may be performed in various manners according to fingerprint information of the fingerprint-touch input. For example, if the user fingerprint-touches a scroll bar, a navigation key or a side key, a screen (e.g., a list screen or a thumbnail-viewer screen) currently being displayed on the display module 151 may be scrolled, or may be replaced with another screen according to fingerprint information. For this, the current screen may be configured to be scrolled at different speeds according to with what finger the user fingerprint-touches the display module 151. If the user fingerprint-touches the display module 151 with a thumb, the current screen may be scrolled at a lowest speed. If the user fingerprint-touches the display module 151 with an index finger, the current screen may be scrolled at a second lowest speed. If the user fingerprint-touches the display module 151 with a middle finger, the current screen may be scrolled at a normal speed. If the user fingerprint-touches the display module 151 with a ring finger, the current screen may be scrolled at a second highest speed. If the user fingerprint-touches the display module 151 with a little finger, the current screen may be scrolled at a highest speed. Similarly, if the user flickers the current screen with an index finger, the current screen may be flickered at a low speed. On the other hand, if the user flickers the current screen with a ring finger, the current screen may be flickered at a high speed.

If the user fingerprint-touches a navigation key, a fast forward key, a rewind key or a progressive bar, playback speed may be varied, or switching between items may be performed. For example, if the user fingerprint-touches a progressive bar with an index finger and then drags the index finger in a certain direction, playback speed may slowly increase or decrease. On the other hand, if the user fingerprint-touches the progressive bar with a ring finger, the playback speed may quickly increase or decrease.

Alternatively, a screen may be configured to be scrolled at different speeds in response to different fingerprints acquired from different users. For example, if a first user fingerprint-touches a screen, the screen may be scrolled at low speed. On the other hand, if a second user fingerprint-touches the screen, the screen may be scrolled at high speed.

If a screen such as a mini-map screen is fingerprint-touched, the screen may be moved or scrolled, and the distance by which the screen is moved or scrolled may vary from one fingerprint information to another fingerprint information. More specifically, a screen may be moved or scrolled in accordance with a fingerprint-touch input on a block-by-block basis, a letter-by-letter basis, a line-by-line basis, or a page-by-page basis. For example, if the user fingerprint-touches an e-book screen with an index finger, the user may return to a previous page of the e-book screen. On the other hand, if the user fingerprint-touches the e-book screen with a middle finger, the user may proceed to a subsequent page of the e-book screen. Alternatively, if the user fingerprint-touches the e-book screen with an index finger, the user may return to a first page of the e-book screen. On the other hand, if the user fingerprint-touches the e-book screen with a middle finger, the user may proceed to a last page of the e-book screen. Still alternatively, if the user fingerprint-touches the e-book screen with an index finger, the e-book screen may be scrolled up by one line. On the other hand, if the user fingerprint-touches the e-book screen with a middle finger, the e-book screen may be scrolled down by one line.

A screen may be configured to be scrolled at various speeds according to the duration in which a fingerprint-touch input is detected. In this case, a screen may be scrolled at different speeds in response to the same fingerprint. For example, when the user fingerprint-touches a scrollbar with an index finger, the scroll speed may increase in accordance with the duration in which a fingerprint-touch input is detected.

Scrolling may be automatically initiated or terminated in response to a fingerprint-touch input. For example, if the user fingerprint-touches an e-book screen with an index finger, the e-book screen may begin to be automatically scrolled at default speed. On the other hand, if the user fingerprint-touches the e-book screen with a middle finger, the automatic scrolling of the e-book screen may be terminated.

In the second exemplary embodiment, fingerprint information may be detected from where a corresponding fingerprint-touch is detected. However, the present invention is not restricted to this. That is, the detection of fingerprint information may be performed in various manners. For example, if a fingerprint touch and then a drag are detected, fingerprint information may be detected only once from where the fingerprint-touch is detected, and then, an operation corresponding to the drag may be performed without the need to additionally detect fingerprint information. Alternatively, the operation corresponding to the drag may be performed only if fingerprint information detected during the drag matches with the fingerprint information detected from where the fingerprint-touch is detected. Still alternatively, the operation corresponding to the drag may be performed only if fingerprint information detected from where the drag begins matches with fingerprint information detected from where the drag ends.

The operation of the mobile terminal 100 may be controlled not only in consideration of whether a fingerprint-touch input and a drag input are detected but also in consideration of the patterns of the fingerprint-touch input and the drag input. For example, if the user finger-touches the display module 151 with a finger and then drags the finger to draw an up-arrow '↑', the user may return to a previous page. On the other hand, if the user finger-touches the display module 151 with a finger and then drags the finger to draw a down-arrow '↓', the user may proceed to a next page. That is, various screen control operations may be performed in accordance with in what motion the user drags a finger after fingerprint-touching the display module 151.

Figure 11:
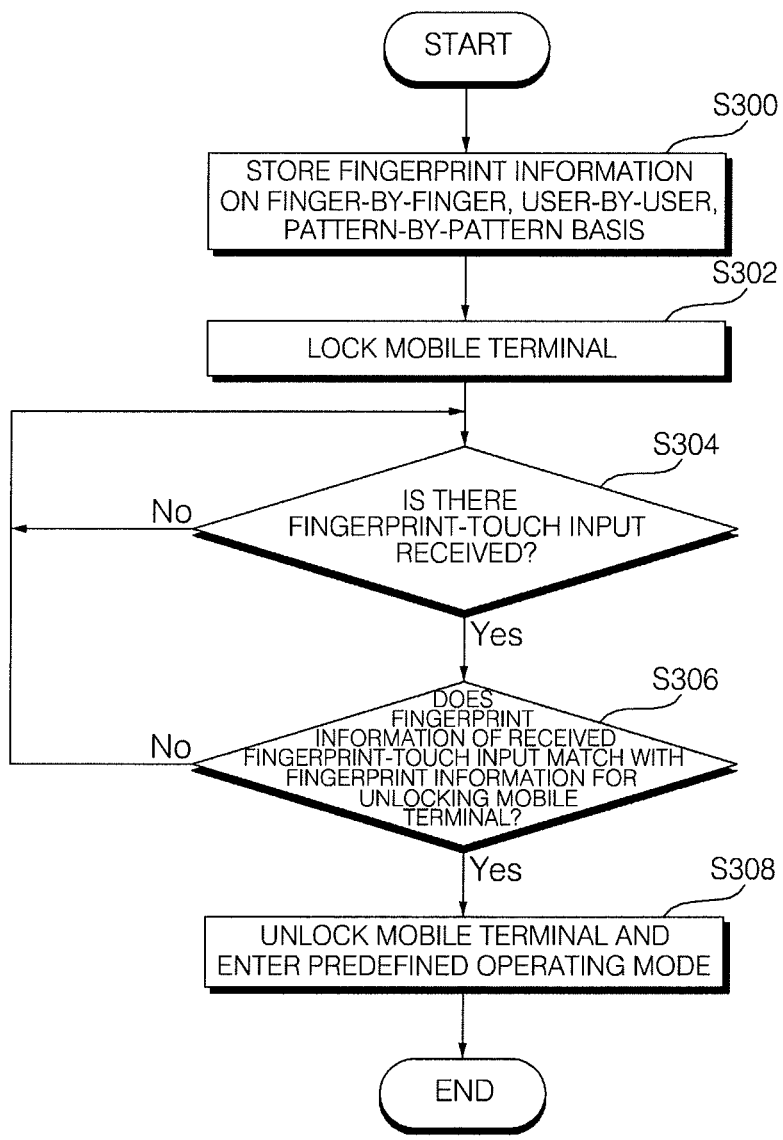
FIG. 11 illustrates a flowchart of a method of controlling a mobile terminal according to a third exemplary embodiment of the present invention.

FIG. 11 illustrates a flowchart of a method of controlling a mobile terminal according to a third exemplary embodiment of the present invention. Referring to FIG. 11, a plurality of pieces of fingerprint information may be stored in the memory 160 on a finger-by-finger basis, on a user-by-user basis and/or on a pattern-by-pattern basis (S300). The plurality of pieces of fingerprint information may be stored along with the descriptions of operating menus or operations that can be performed in association with the plurality of pieces of fingerprint information such as locking or unlocking the mobile terminal 100. For this, a menu for associating fingerprint information with a function such as locking or unlocking the mobile terminal 100 and choosing an operating mode to be entered when the mobile terminal 100 is unlocked may be additionally provided.

Thereafter, if no touch input or key input is received for more than a predefined amount of time or if a command to lock the mobile terminal 100 is received, the controller 180 may lock the mobile terminal 100 (S302). More specifically, the controller 180 may lock the mobile terminal 100 for all operating menus or only for a certain operating menu. The controller 180 may display an icon or generate a sound effect or a haptic effect in order to alert the user.

Thereafter, the controller 180 may determine whether there is a fingerprint-touch input received through the display module 151 (S304). A fingerprint-touch input is a touch input generated by touching the display module 151 with a finger and thus includes fingerprint information.

Thereafter, if it is determined in operation S304 that there is a fingerprint-touch input received through the display module 151, the controller 180 may determine whether fingerprint information of the received fingerprint-touch input matches with previously-stored fingerprint information for unlocking the mobile terminal 100 (S306).

If it is determined in operation S306 that the fingerprint information of the received fingerprint-touch input matches with the previously-stored fingerprint information for unlocking the mobile terminal 100, the controller 180 may unlock the mobile terminal 100, and may enter a predefined operating mode corresponding to the previously-stored fingerprint information for unlocking the mobile terminal 100 (S308). In this case, the controller 180 may generate a sound effect or a haptic effect in order to alert the user to the unlocking of the mobile terminal 100. Thereafter, if a fingerprint-touch input whose fingerprint information matches with previously-stored fingerprint information for locking the mobile terminal 100 is received, the controller 180 may lock the mobile terminal 100 again.

In this manner, it is possible to readily unlock the mobile terminal 100 and enter a predefined operating mode in response to a predefined fingerprint-touch input. In the third exemplary embodiment, the mobile terminal 100 may be unlocked in response to a fingerprint-touch input. However, the present invention is not restricted to this. That is, the mobile terminal 100 may be unlocked by entering a password. In this case, a menu for entering the password may be additionally provided.

Figure 12:
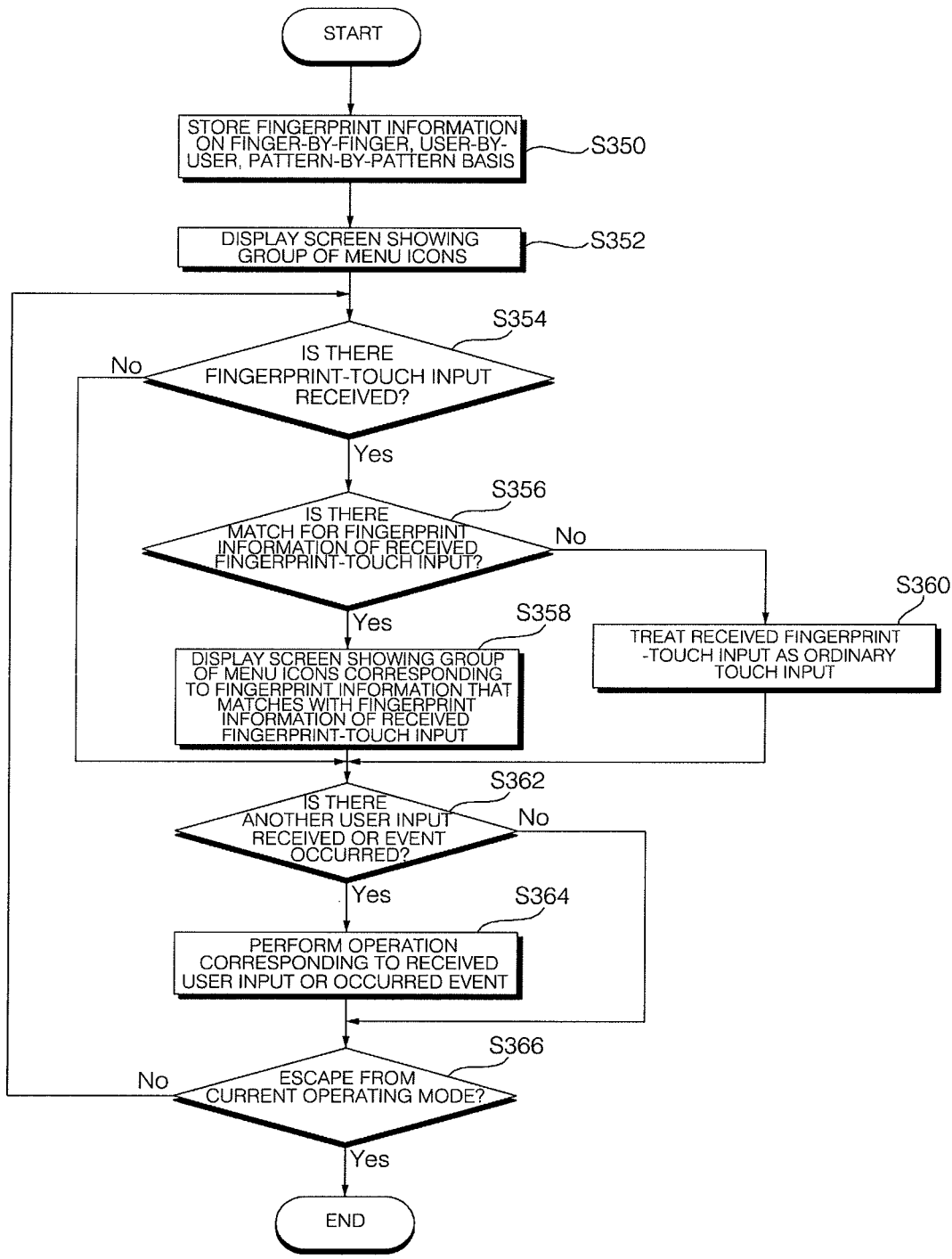
FIG. 12 illustrates a flowchart of a method of controlling a mobile terminal according to a fourth exemplary embodiment of the present invention.

FIG. 12 illustrates a flowchart of a method of controlling a mobile terminal according to a fourth exemplary embodiment of the present invention. Referring to FIG. 12, a plurality of pieces of fingerprint information may be stored in the memory 160 on a finger-by-finger basis, on a user-by-user basis and/or on a pattern-by-pattern basis (S350). Each of the plurality of pieces of fingerprint information may be associated with a group of menu icons.

Thereafter, the controller 180 may display a screen showing a group of menu icons on the display module 151 (S352).

Thereafter, the controller 180 may determine whether there is a fingerprint-touch input received through the display module 151 (S354). A fingerprint-touch input is a touch input generated by touching the display module 151 with a finger and thus includes fingerprint information.

Thereafter, if it is determined in operation S354 that there is a fingerprint-touch input received through the display module 151, the controller 180 may determine whether there is a match for fingerprint information of the received fingerprint-touch input in the memory 160 (S358), and may display a screen showing a group of menu icons corresponding to previously-stored fingerprint information that matches with the fingerprint information of the received fingerprint-touch input on the display module 151 (S358). The group of menu icons corresponding to the previously-stored fingerprint information that matches with the fingerprint information of the received fingerprint-touch input may include menu icons corresponding to operating system native applications, menu icons corresponding to applications downloaded from web stores, or menu icons corresponding to applications preferred or selected by the user. Thereafter, the controller 180 may generate a sound effect or a haptic effect in order to alert the user.

If it is determined in operation S356 that there is no match for the fingerprint information of the received fingerprint-touch input in the memory 160, the controller 180 may control the received fingerprint-touch input to be treated as an ordinary touch input (S360).

If there is a user input, other than a fingerprint-touch input, received or an event occurred (S362), the controller 180 may control an operation corresponding to the received user input or the occurred event to be performed (S364). Operations S354 through S364 may be repeatedly performed until the user chooses to escape from the current menu or operation (S366).

In this manner, it is possible to display various groups of menu icons on the display module 151 in accordance with a fingerprint-touch input.

FIGS. 13 through 17 illustrate how to register fingerprint information in the mobile terminal 100.

Figure 13:
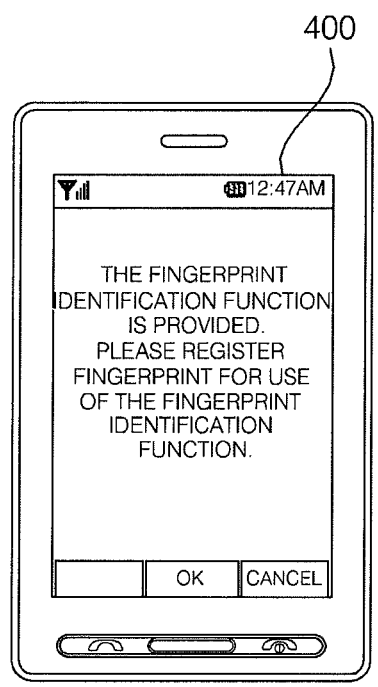
FIGS. 13 through 16 illustrate how to register fingerprint information.
Figure 14:
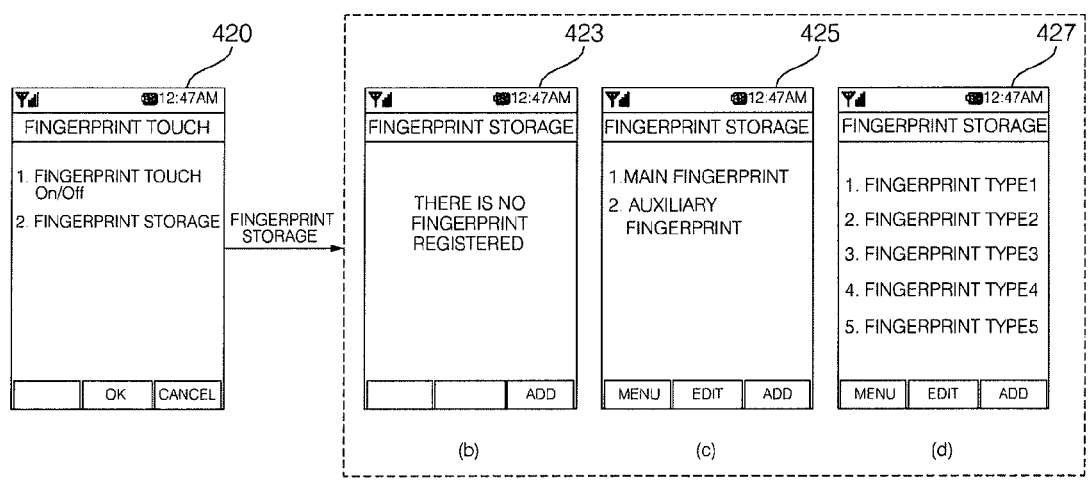

Referring to FIG. 13, if no fingerprint is registered in the mobile terminal 100 when the mobile terminal 100 is turned on, a fingerprint registration alert screen 400 recommending that fingerprint information be registered may be displayed on the display module 151. When no fingerprint is registered in the mobile terminal 100, a fingerprint-touch input may be treated as an ordinary touch input.

FIG. 14(a) illustrates a fingerprint registration setting screen 420. Referring to FIG. 14(a), a 'fingerprint touch on/off' item may be used to turn on or off a fingerprint touch function, and a 'fingerprint storage' item may provide various fingerprint management functions such as the registration, editing, and deletion of fingerprints, and the setting or cancellation of main fingerprints.

Referring to FIG. 14(b), if the 'fingerprint storage' item is selected when no fingerprint is registered in the mobile terminal 100, a screen 423 indicating that there is no fingerprint registered in the mobile terminal 100 may be displayed. On the other hand, referring to FIG. 14(c) or 14(d), if the 'fingerprint storage' item is selected when there are fingerprints registered in the mobile terminal 100, a screen 425 or 427 may be displayed. Alternatively, a screen for registering fingerprints from different fingers may be displayed. Thereafter, if a 'menu' item is selected, a menu including a plurality of menu items such as 'add fingerprint,' 'edit fingerprint,' 'set main fingerprint,' 'delete fingerprint,' and 'delete all fingerprints' may be displayed.

The whole surface of the display module 151 may be used as a fingerprint sensing area. Alternatively, for a more efficient fingerprint registration or identification, a certain part of the surface of the display module 151 may be set and used as a valid fingerprint sensing area.

Figure 15:
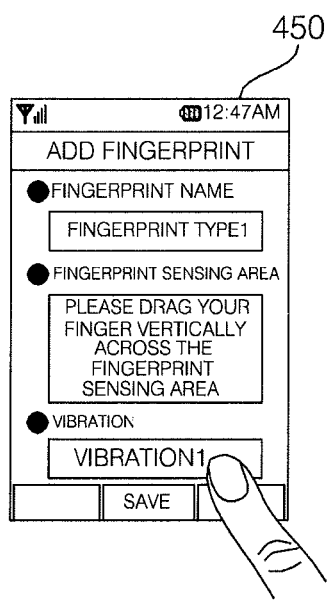

FIG. 15 illustrates a haptic effect setting screen 450 for registering a haptic effect to be generated in connection with a fingerprint. Referring to FIG. 15, different haptic effects may be registered for different individuals, for different fingerprints or for different fingerprint patterns. Then, if a fingerprint-touch input is received, a haptic effect corresponding to fingerprint information of the received fingerprint-touch input may be generated. The intensity and pattern of the haptic effect may be altered in response to a touch input or a key input generated by the user.

Figure 16:
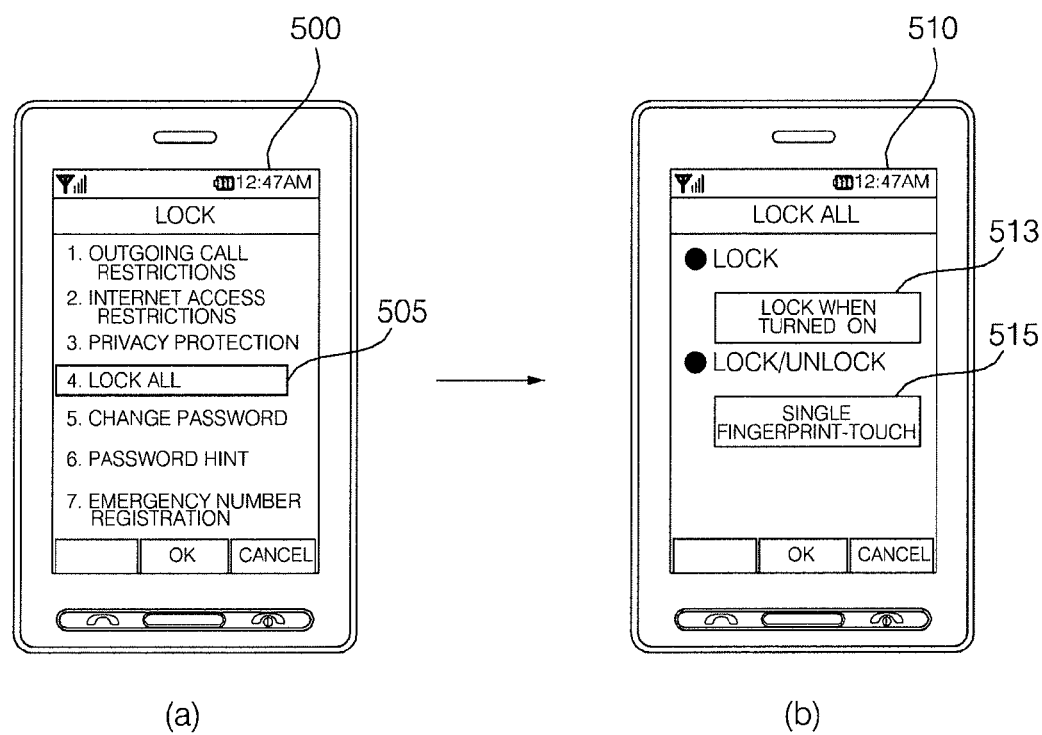
Figure 17:
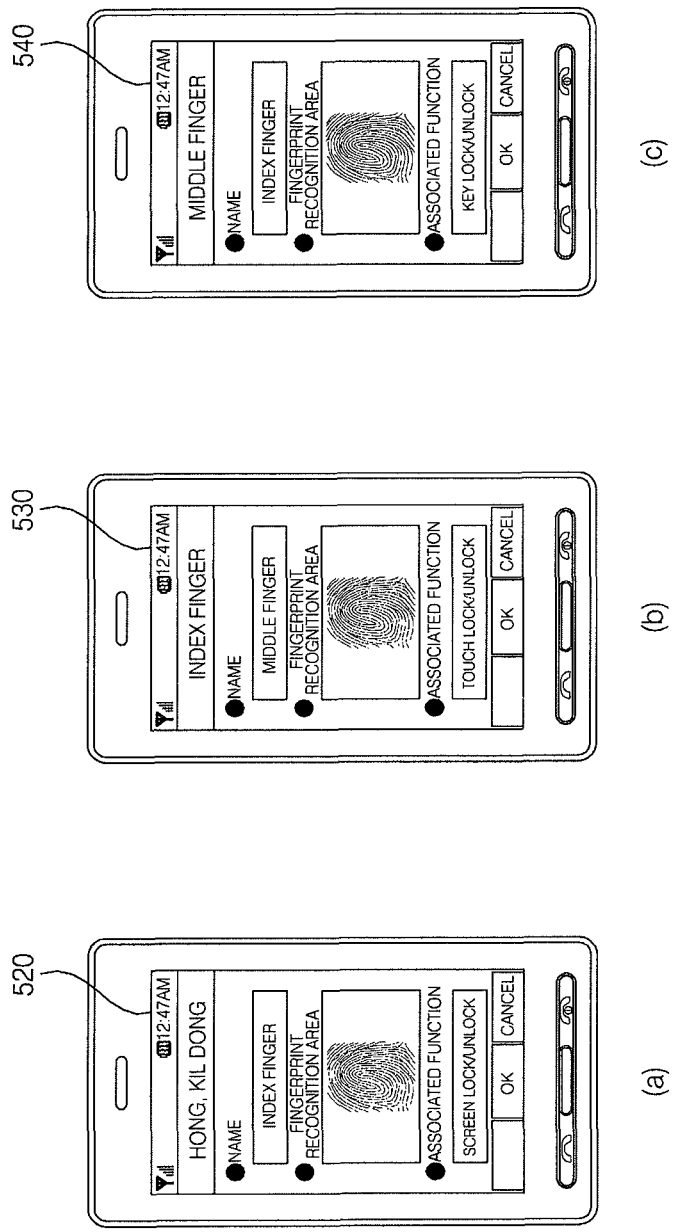
Figure 18:
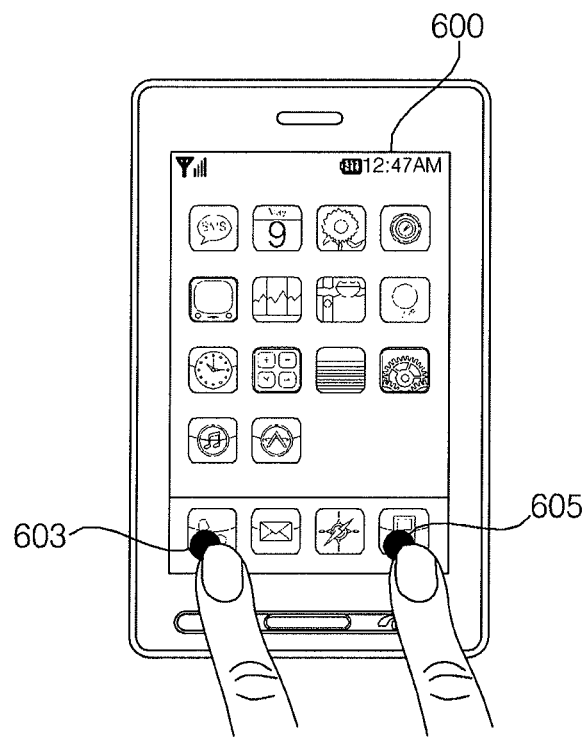
Figure 19:
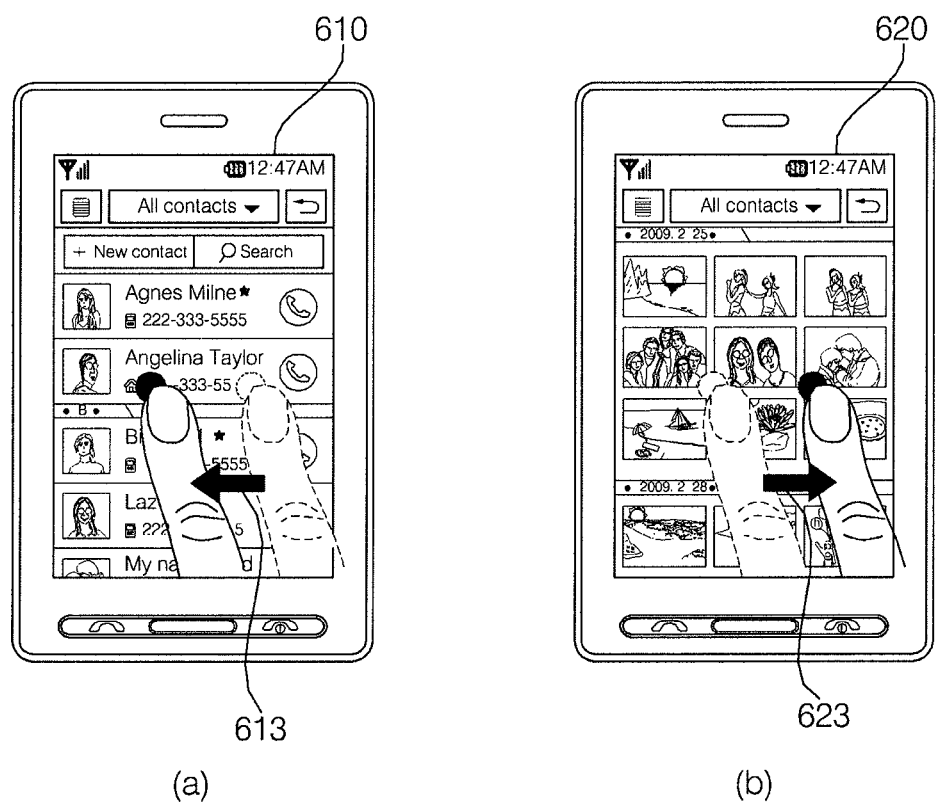
Figure 20:
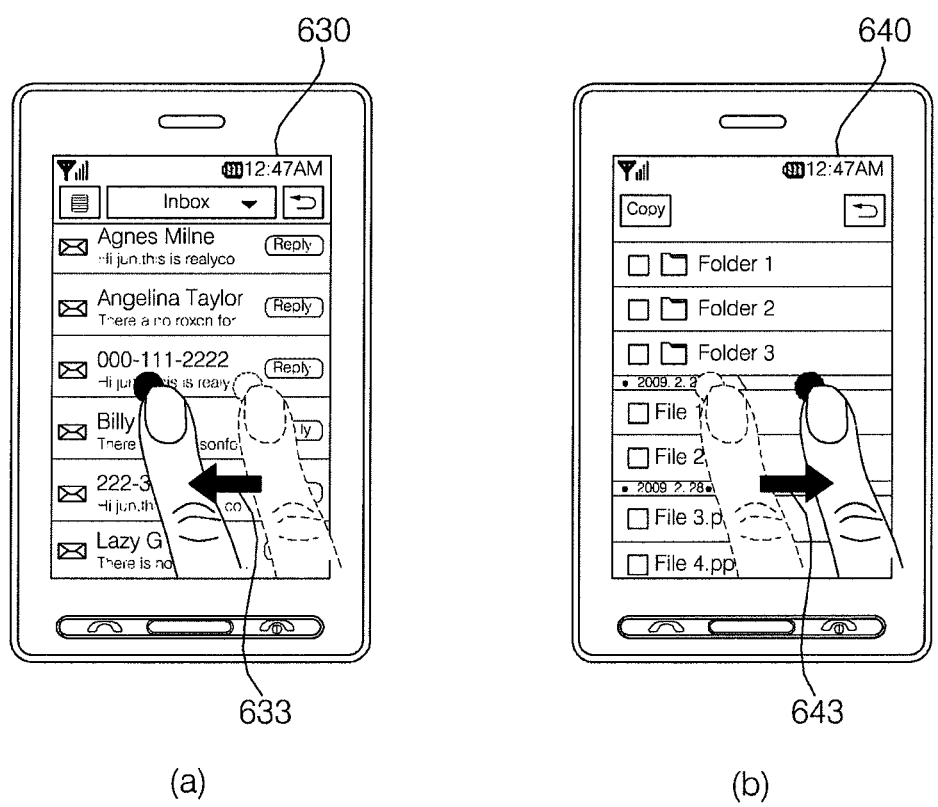
Figure 24:
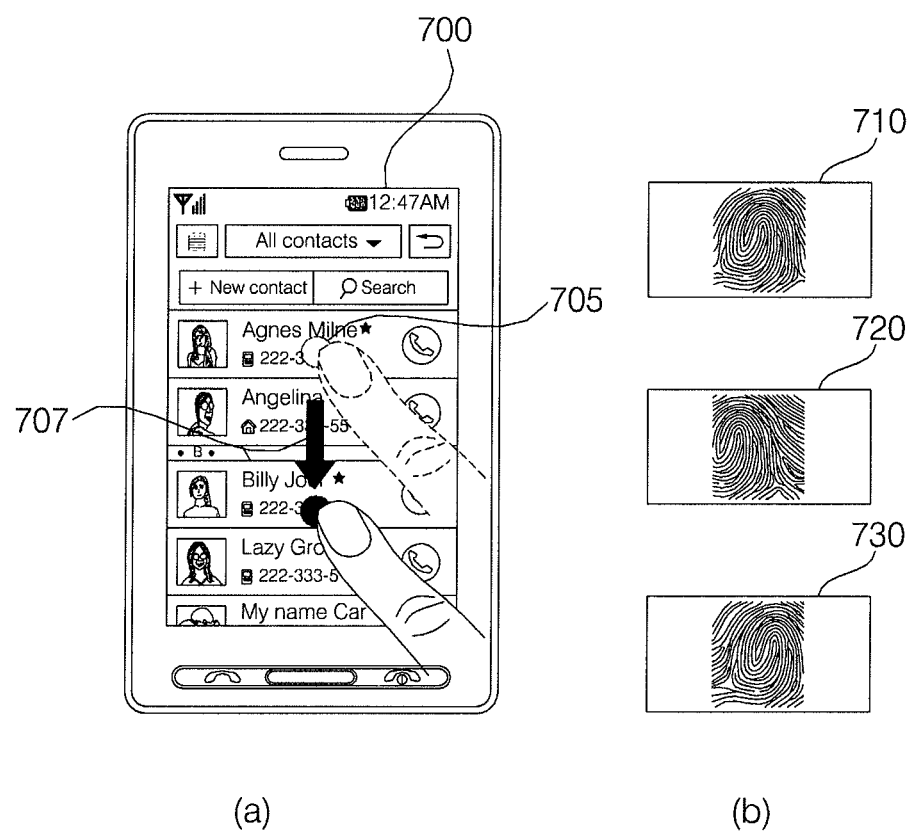

FIG. 16 illustrates how to lock the mobile terminal 100. Referring to FIG. 16(a), the mobile terminal 100 may be locked by fingerprint-touching a 'Lock' screen 500. More specifically, if a 'Lock All' item 505 is selected, a 'Lock All' screen 510 allowing the user to choose when to lock the mobile terminal 100 and how to lock or unlock the mobile terminal 100 may be displayed, as shown in FIG. 16(b).

Referring to FIG. 16(b), a drop-down list 513 may display a list of values, from which the user may select one, i.e., 'Lock When Turned On,' 'Lock When USIM Changes,' 'Lock Immediately,' 'Unlock,' and may thus allow the user whether and when to lock or unlock the mobile terminal 100. If the user selects the value 'Lock Immediately,' the mobile terminal 100 may be readily locked, and an idle screen may be displayed on the display module 151, alerting the user to the locking of the mobile terminal 100. If the user selects the value 'Lock When Turned On,' the mobile terminal 100 may be locked when turned on. If the user selects the value 'Lock When USIM Changes,' the mobile terminal 100 may be locked when a current USIM card is replaced with another USIM card. A drop-down list 515 may allow the user to choose whether the mobile terminal 100 should be locked and unlocked in response to a single fingerprint-touch input or a complex fingerprint-touch input. More specifically, if a '#' key of the user input unit 130 is pressed for a long time, the mobile terminal 100 may be readily locked. On the other hand, if the '#' key is pressed shortly, the mobile terminal 100 may be unlocked.

FIGS. 17(a) through 17(c) illustrate diagrams of screens 520, 530 and 540, respectively, for registering a function to be performed in connection with a fingerprint. Referring to FIGS. 17(a) through 17(c), various 'lock' functions may be associated with different fingerprint information. More specifically, different operating menus or functions may be associated with different fingerprints. Alternatively, in case that a fingerprint registered as main fingerprint information is damaged, more than one other fingerprint acquired from the same user may be registered as auxiliary fingerprint information, and the main fingerprint information and the auxiliary fingerprint information may both be associated with the same operating menu or function.

FIGS. 18 through 21 illustrate how to lock or unlock the mobile terminal 100 in response to a fingerprint-touch input. The mobile terminal 100 may be locked or unlocked by fingerprint-touching a certain part of the display module 151. For example, referring to FIG. 18, if a fingerprint-touch input 603 is detected from a lower left part of an operation screen 600, the mobile terminal 100 may be locked. On other hand, if a fingerprint-touch input 605 is detected from a lower right part of the operation screen 600, the mobile terminal 100 may be unlocked.

Alternatively, the mobile terminal 100 may be locked or unlocked according to with what finger the user touches the display module 151. Still alternatively, the mobile terminal 100 may be locked or unlocked according to whether a fingerprint-touch input is detected for more than a predefined amount of time. In this case, the controller 180 may generate vibration whose intensity increases or decreases in accordance with the duration in which a fingerprint-touch input is detected in order to alert the user.

Referring to FIG. 19(a), if the user fingerprint-touches an operation screen 610 with a finger and then drags the finger in a first direction, for example, in a leftward direction, as indicated by reference numeral 613, the mobile terminal 100 may be locked. On the other hand, referring to FIG. 19(b), if the user fingerprint-touches the operation screen 610 with a finger and then drags the finger in a second direction, which is opposite to the first direction, for example, in a rightward direction, as indicated by reference numeral 623, the mobile terminal 100 may be unlocked. In this manner, the mobile terminal 100 can be locked or unlocked for all operating menus or functions.

Referring to FIGS. 20(a) and 20(b), if the user fingerprint-touches a certain item 635 or 645 with a finger and then drags the finger in a certain direction, the mobile terminal 100 may be locked or unlocked only for an operating menu or function corresponding to the item 635 or 645.

Referring to FIGS. 21(a) and 21(b), if the user fingerprint-touches the display module 151 with two or more fingers and then moves the fingers apart, the mobile terminal 100 may be locked. On the other hand, if the user fingerprint-touches the display module 151 with two or more fingers and then pinches the fingers apart, the mobile terminal 100 may be unlocked.

The locking and unlocking of the mobile terminal 100 may be performed in response to other types of gestures, other than pinching or stretching. For example, if the user fingerprint-touches the display module 151 with one or more fingers and then drag the fingers to draw an L, the mobile terminal 100 may be locked. Then, if the user fingerprint-touches the display module 151 with one or more fingers and then drag the fingers to draw a U, the mobile terminal 100 may be unlocked. The mobile terminal 100 may be locked if the user fingerprint-touches the display module 151 with a finger and then drag the finger to draw a symbol such as '→,' '←,' '↑,' '↓,' or '☆.' Alternatively, a lock icon may be provided on the display module 151. Then, if the user fingerprint-touches the lock icon with a finger and then drags the finger to a certain position on the display module 151, the mobile terminal 100 may be locked or unlocked.

FIGS. 22 through 30 illustrate how to perform screen control in accordance with a fingerprint-touch input.

Referring to FIGS. 22 and 23, different fingerprints acquired from different users, different fingerprints acquired from different fingers of the same user, or different fingerprints having different patterns may be associated with different control values. For example, a thumbprint may be associated with a lowest scroll speed, the fingerprint of an index finger may be associated with a second lowest scroll speed, the fingerprint of a middle finger may be associated with a normal scroll speed, the fingerprint of a ring finger may be associated with a second highest scroll speed, and the fingerprint of a little finger may be associated with a highest scroll speed. Alternatively, different fingerprints may be associated with different scroll amounts of, for example, one line, two lines, three lines, four lines, and five lines.

Referring to FIGS. 24(a) and 24(b), the user may fingerprint-touch an operation screen 700 with a finger, as indicated by reference numeral 705, and then drag the finger downward, as indicated by reference numeral 707. In this case, more than one fingerprint information (i.e., a plurality of pieces of fingerprint information 710, 720 and 730) may be acquired from where the user begins to drag the operation screen 700, from where the user drops the operation screen 700 and from anywhere in between. The plurality of pieces of fingerprint information 710, 720 and 730 may be used all together, or in various combinations depending upon need.

Figure 25:
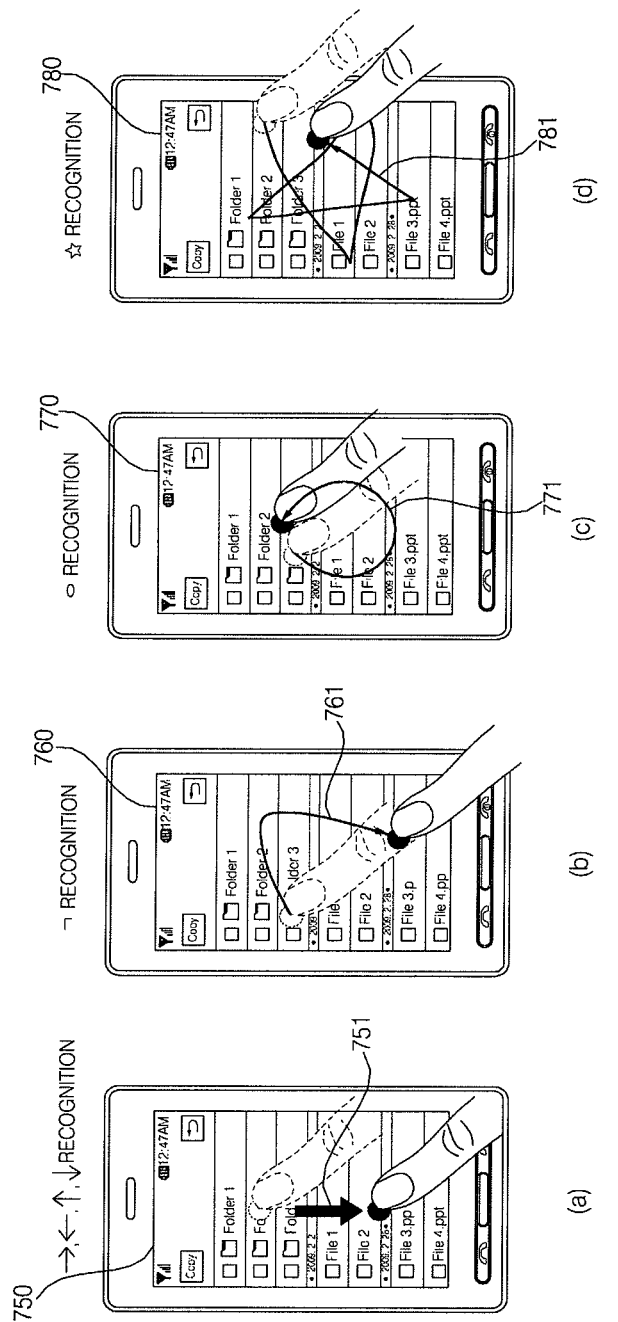

FIG. 25 illustrates various types of fingerprint-touch inputs for use in screen control. Referring to FIGS. 25(a) through 25(d), the user may control the display of a screen by fingerprint-touching the display module 151 with a finger and then dragging the finger to draw an arrow such as '→,' '←,' '↑,' or '↓,' a reversed 'L' or a circle, or a symbol such as '☆.'

Figure 26:
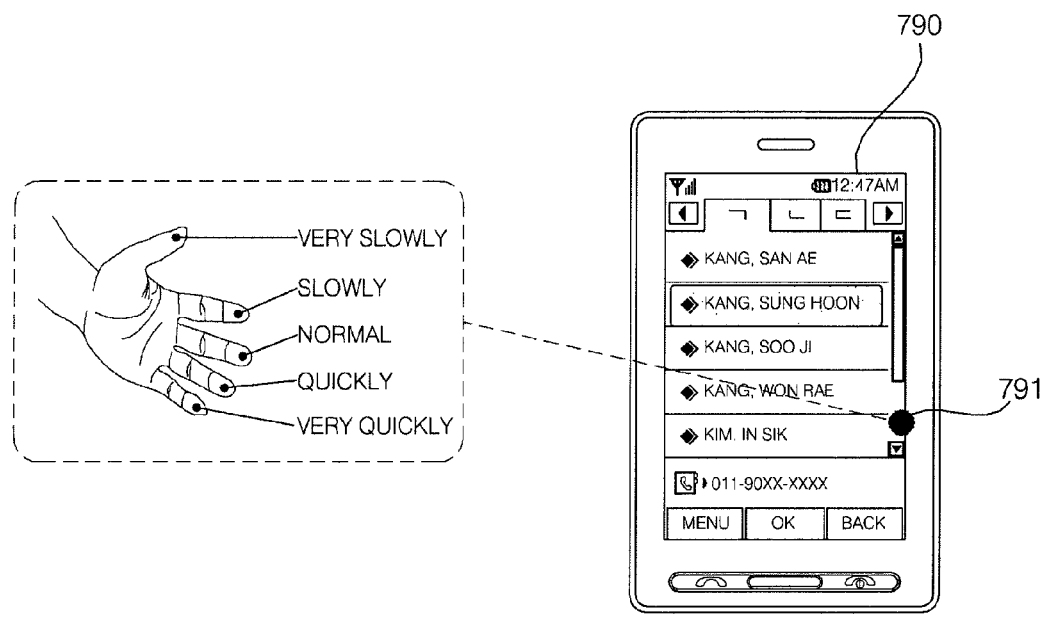

Referring to FIG. 26, if the user fingerprint-touches a scrollbar 791 on a phonebook menu screen 790 with an index finger, the phonebook menu screen 790 may be scrolled at low speed. On the other hand, if the user fingerprint-touches the scrollbar 791 with a ring finger, the phonebook menu screen 790 may be scrolled at high speed.

Similarly, if the user fingerprint-touches one of a plurality of navigation key with an index finger, the user may move to a next page slowly. On the other hand, if the user fingerprint-touches one of the navigation keys with a ring finger, the user may move to the next group quickly. If the user fingerprint-touches a side hot key with an index finger, scrolling may also be performed, and the speed of scrolling may vary according to fingerprint information.

Figure 27:
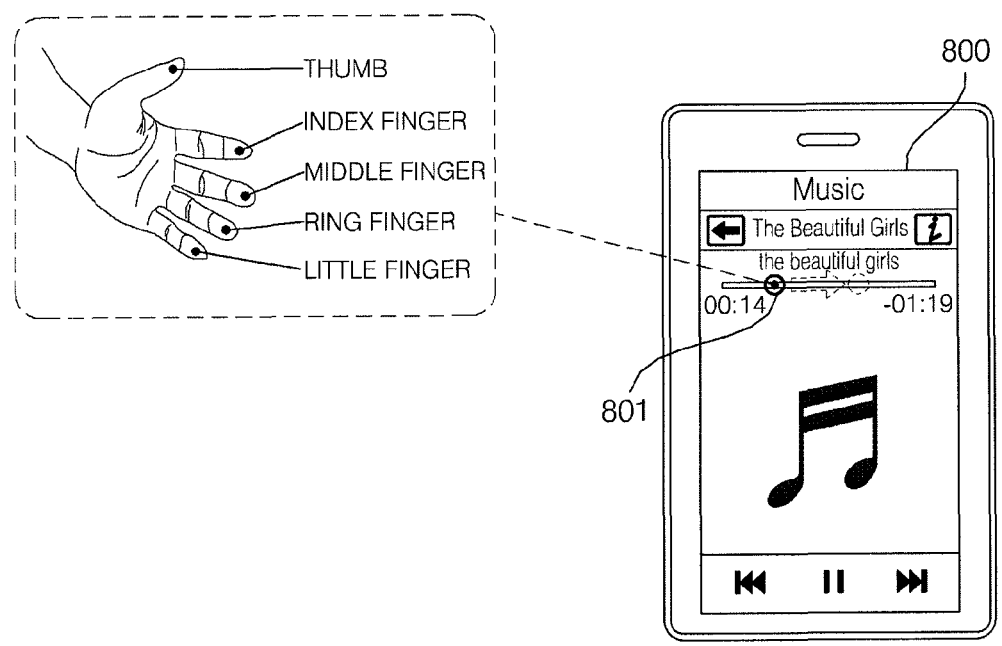

Referring to FIG. 27, if the user touches a progressive bar on a multimedia file playback screen 800 with a finger and then drags the finger across the multimedia file playback screen 800, a search of a moving image, an MP3 file or an audio file may be performed, and the speed of the search may vary according to with what finger the user touches the progressive bar. For example, if the user touches the progressive bar with an index finger, a normal search may be performed. On the other hand, if the user touches the progressive bar with a middle finger, a quick search may be performed. Similarly, the speed of search of multimedia data may be controlled in various manners if a 'Fast Forward' key, a 'Rewind' key or another key for controlling the playback of multimedia data is selected in response to a fingerprint-touch input.

Figure 28:
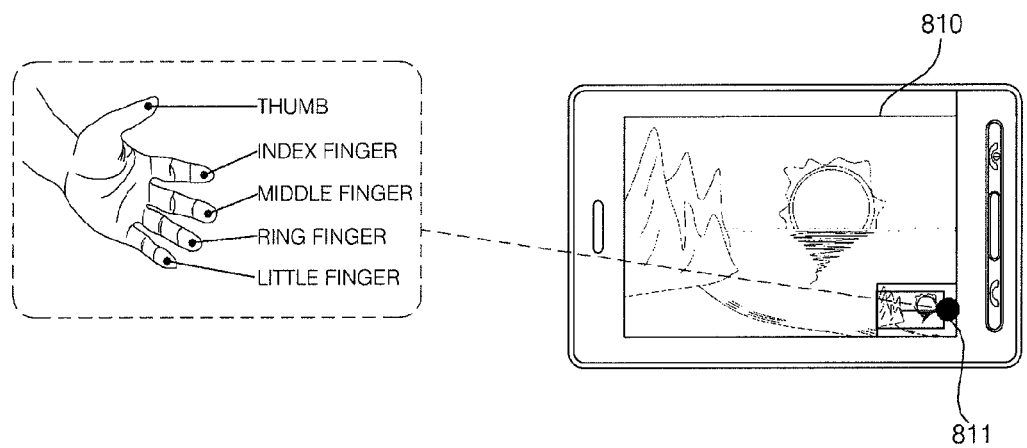

Referring to FIG. 28, if the user fingerprint-touches a mini-map 811 on an image viewer screen 810 with an index finger, the mini-map 810 may be moved slowly. On the other hand, if the user fingerprint-touches the mini-map 811 with a ring finger, the mini-map 811 may be moved quickly. Similarly, a mini-map on a web browser screen can be moved at different speeds in response to different fingerprint information.

Figure 29:
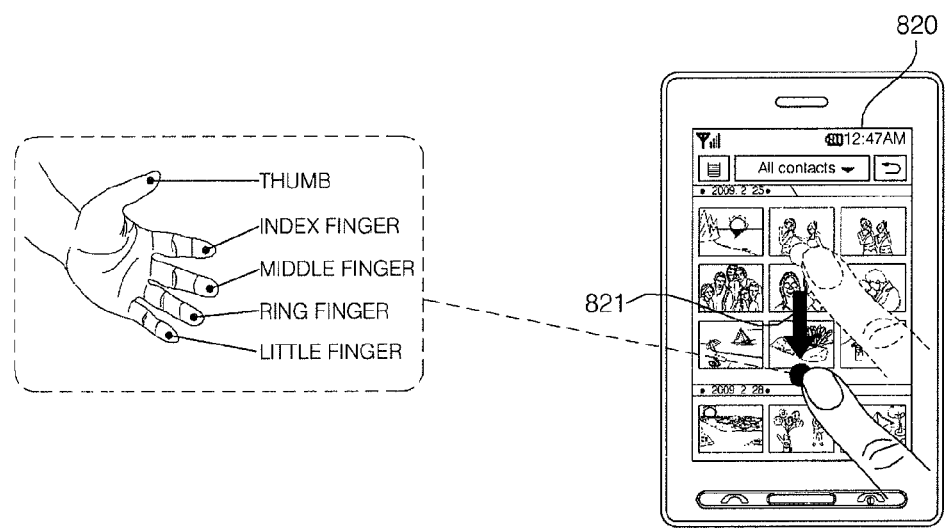

Referring to FIG. 29, if the user fingerprint-touches a thumbnail viewer screen 820 with a finger and then drags the finger across the thumbnail viewer screen 820, as indicated by reference numeral 821, the thumbnail viewer screen 820 may be scrolled, and the speed at which, or the amount by which the thumbnail viewer screen 820 is scrolled may vary according to fingerprint information. For example, if the user fingerprint-touches the thumbnail viewer screen 820 with an index finger and then drags the index finger down, the thumbnail viewer screen 820 may be scrolled down slowly. On the other hand, if the user fingerprint-touches the thumbnail viewer screen 820 with a ring finger and then drags the ring finger down, the thumbnail viewer screen 820 may be scrolled down quickly.

The speed at which a thumbnail viewer screen or a list screen is flickered may vary according to fingerprint information. In addition, the amount by which a thumbnail viewer screen or a list screen is scrolled may vary according to fingerprint information. For example, if the user fingerprint-touches a thumbnail image screen or a list screen with an index finger, the thumbnail image screen or the list screen may be scrolled down by an amount corresponding to ½ of a page. On the other hand, if the user fingerprint-touches the thumbnail image screen or the list screen with a middle finger, the thumbnail image screen or the list screen may be scrolled down by an amount corresponding to ¼ of a page.

Figure 30:
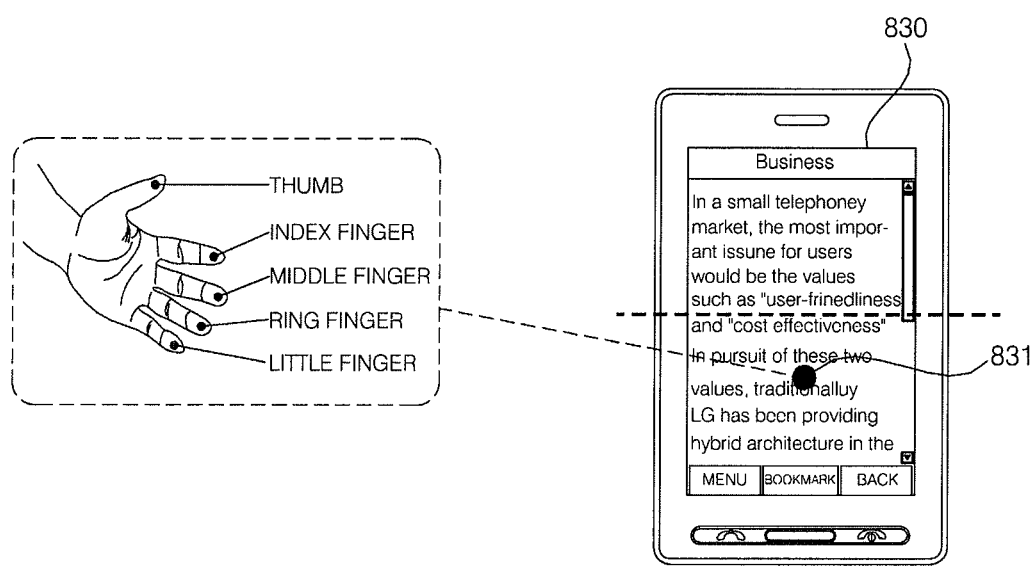

Referring to FIG. 30, if a fingerprint-touch input 831 is detected from a document viewer screen 830, the document viewer screen 830 may be scrolled in response to the fingerprint-touch input 831, and the speed of scrolling the document viewer screen 830 may vary according to fingerprint information. More specifically, if the user fingerprint-touches a lower half of a current page on the document viewer screen 830 with an index finger, the document viewer screen 830 may be scrolled slowly on a page-by-page basis. On the other hand, if the user fingerprint-touches the lower half of the current page on the document viewer screen 830 with a ring finger, the document viewer screen 830 may be scrolled quickly on a page-by-page basis.

The document viewer screen 830 may be scrolled by a fingerprint-touch-based flickering gesture, and the scroll speed of the document viewer screen 830 may vary according to with what finger the document viewer screen 830 is flickered. For example, if the document viewer screen 830 is flickered with an index finger, the document viewer screen 830 may be scrolled slowly. On the other hand, if the document viewer screen 830 is flickered with a middle finger, the document viewer screen 830 may be scrolled quickly.

The document viewer screen 830 may be moved in response to a fingerprint-touch input, and the distance by which the document viewer screen 830 is moved may vary according to fingerprint information of the fingerprint-touch input.

Figure 31:
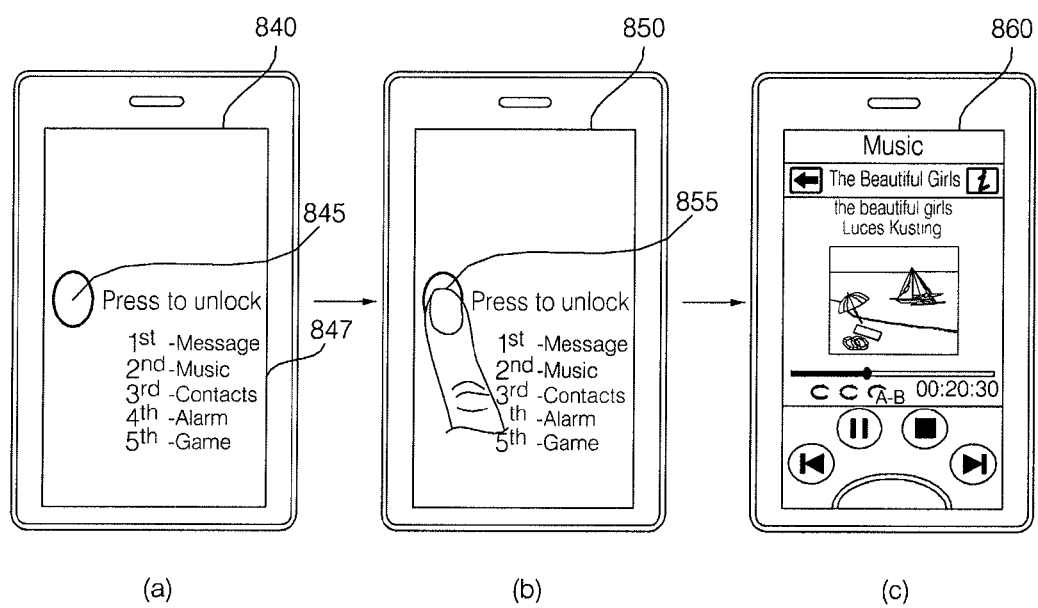
FIG. 31 illustrates how to unlock a mobile terminal and enter a predetermined operating mode in response to a fingerprint-touch input.

FIG. 31 illustrates how to unlock the mobile terminal 100 and then enter a predefined operating mode in response to a fingerprint-touch input. Referring to FIG. 31(a), when the mobile terminal 100 is locked, a lock screen 830 may be displayed on the display module 151. The lock screen 830 may include a touch area 845 for unlocking the mobile terminal 100. If the user fingerprint-touches the touch area 845 with a finger, the mobile terminal 100 may be unlocked, and a guide message 847 indicating an operating mode to be entered may be displayed. Referring to FIG. 31(b), if the user fingerprint-touches the touch area 845 with an index finger, as indicated by reference numeral 855, the mobile terminal 100 may be unlocked, and may readily enter a music player mode. Then, referring to FIG. 31(c), a music player screen 860 may be displayed on the display module 151.

In this manner, it is possible to unlock the mobile terminal 100 in accordance with a fingerprint-touch input and readily enter a predefined operating mode corresponding to fingerprint information of the fingerprint-touch input, such as a mode for sending/receiving messages, checking a list of calls or setting the alarm.

Figure 32:
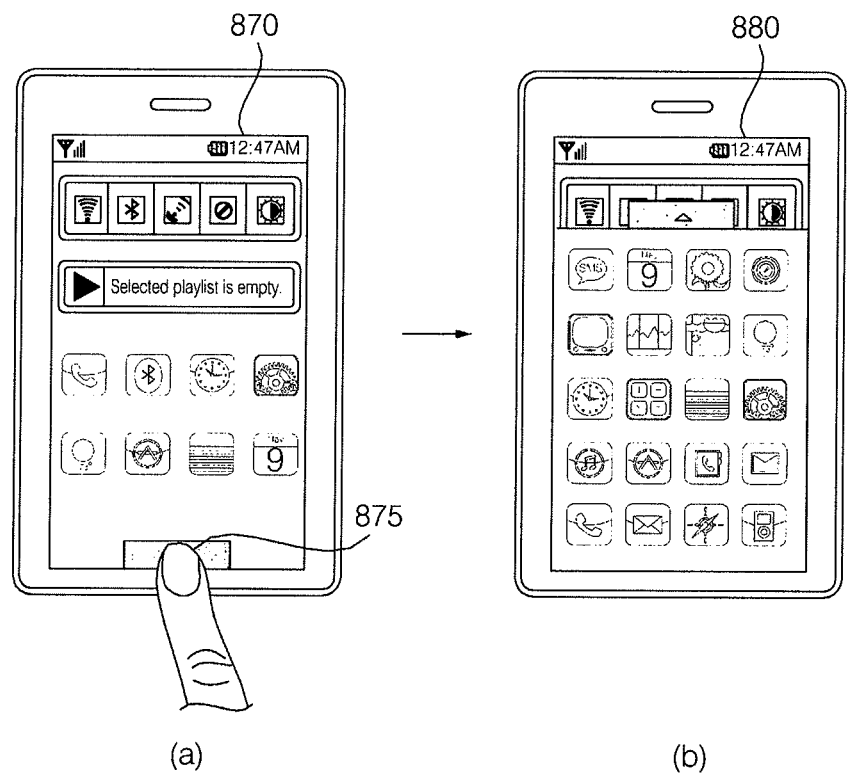
FIGS. 32 and 33 illustrate how to display menu icons classified into different menu groups in response to a fingerprint-touch input.
Figure 33:
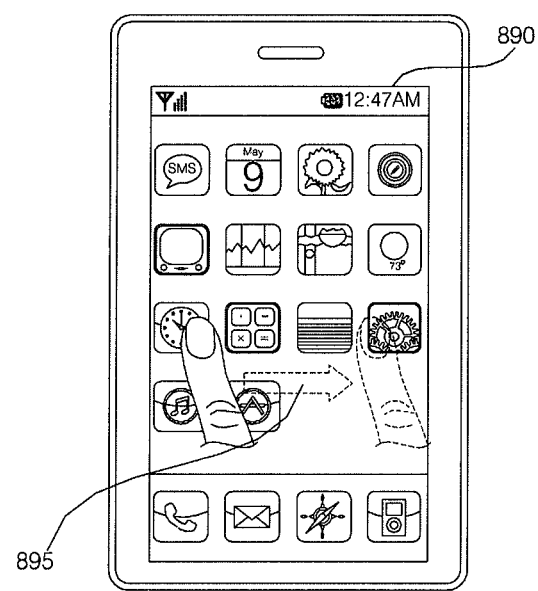

FIGS. 32 and 33 illustrate how to display different groups of menu icons in response to different fingerprint information. Referring to FIGS. 32(a) and 32(b), if a fingerprint-touch input 875 is detected from a screen 870 showing a group of menu icons, a screen 880 showing a predefined group of menu icons corresponding to fingerprint information of the fingerprint-touch input 875 may be displayed.

For example, if the user fingerprint-touches the screen 870 with an index finger, a group of menu icons representing operating system native applications may be displayed. On the other hand, if the user fingerprint-touches the screen 870 with a middle finger, a group of menu icons representing applications downloaded from a web store may be displayed. On the other hand, if the user fingerprint-touches the screen 870 with a ring finger, a group of menu icons representing applications preferred or selected by the user may be displayed.

When the screen 880 showing a different group of menu icons from the screen 870 is displayed, a screen effect, a sound effect or a haptic effect may be generated in order to alert the user.

Alternatively, referring to FIG. 33, if a fingerprint touch-and-drag 895 is detected from a screen 890 showing a group of menu icons, a screen showing another group of menu icons may be displayed. The group of menu icons displayed in response to the fingerprint touch-and-drag 895 may vary according to with what finger the fingerprint touch-and-drag 895 is generated.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to store a plurality of pieces of fingerprint information in a mobile terminal on a finger-by-finger, user-by-user or pattern-by-pattern basis and to lock or unlock the mobile terminal for various operating menus in response to a fingerprint-touch input. In addition, it is possible to perform various screen control operations (such as scrolling or controlling scroll speed) in response to a fingerprint-touch input. Moreover, it is possible to unlock a mobile terminal and then readily enter a predefined operating mode in response to a fingerprint-touch input. Furthermore, it is possible to display various groups of menu icons one after another in response to a fingerprint-touch input and to control various operations performed by a mobile terminal with convenience by using not only a fingerprint-touch input but also a key input or an ordinary touch input.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    storing, in a memory of the mobile terminal, a plurality of fingerprint information on at least one of a finger-by-finger basis, a user-by-user basis, and a fingerprint pattern-by-pattern basis in association with different operations to be performed on the mobile terminal;
    displaying an operation screen on a display module;
    receiving a fingerprint-touch input through the display module, the display module configured to receive a touch input and simultaneously identify a fingerprint;
    performing an operation on the mobile terminal corresponding to fingerprint information of the received fingerprint-touch input that matches with one of the stored plurality of fingerprint information; and
    recognizing the received fingerprint-touch input as an ordinary touch input and performing a predefined operation corresponding to a point of detection of the received fingerprint-touch input if the fingerprint information of the received fingerprint-touch input is determined not to match one of the plurality of fingerprint information stored in the memory,
    wherein the performing the operation comprises controlling the display of the operation screen in accordance with a control value corresponding to the fingerprint information that matches with the fingerprint information of the received fingerprint-touch input, and
    wherein the controlling the display of the operation screen comprises scrolling the operation screen at a speed corresponding to the control value, changing a playback speed of the operation screen to a speed corresponding to the control value and moving the operation screen by a distance corresponding to the control value.

2. The method of claim 1, further comprising:
    searching the stored plurality of the fingerprint information for the fingerprint information of the received fingerprint-touch input; and
    extracting the operation to be performed on the mobile terminal that corresponds with the searched fingerprint information of the received fingerprint-touch input.

3. The method of claim 1, wherein the operation performed on the mobile terminal includes one of locking the mobile terminal, unlocking the mobile terminal, and temporarily unlocking the mobile terminal for a predetermined amount of time.

4. The method of claim 1, wherein the operation performed on the mobile terminal includes one of locking all operating menus, locking only particular operating menus, unlocking only the particular operating menus and unlocking all operating menus.

5. The method of claim 1, wherein the different operations to be performed on the mobile terminal stored in association with the plurality of fingerprint information include instructions for displaying different groups of menu icons.

6. The method of claim 5, wherein the different groups of menu icons include menu icons representing operating system applications, menu icons representing downloaded applications, and menu icons representing user-preferred applications.

7. The method of claim 1, wherein the operation performed on the mobile terminal includes playing a multimedia program on the mobile terminal at a predetermined playback speed corresponding to the fingerprint information of the received fingerprint-touch input that matches with one of the stored plurality of fingerprint information.

8. The method of claim 1, further comprising:
    outputting an indicating event indicating the operation is being performed on the mobile terminal.

9. The method of claim 1, wherein the received fingerprint-touch input includes one of 1) a fingerprint-touch input generated by touching the display module with a finger and dragging the finger in a predetermined direction, 2) a fingerprint-touch input generated by touching the display module with a finger and dragging the finger in a predetermined pattern, 3) a fingerprint-touch input generated by touching a first position on the display module with a finger and dragging the finger from the first position to a second position on the display module, 4) a fingerprint-touch input generated by touching the display module with pressure, and 5) a fingerprint-touch input generated by touching the display module for more than a predefined amount of time.

10. A mobile terminal, comprising:
    a memory configured to store a plurality of fingerprint information on at least one of a finger-by-finger basis, a user-by-user basis, and a fingerprint pattern-by-pattern basis in association with different operations to be performed on the mobile terminal;
    a display module configured to display an operation screen and to receive a touch input and simultaneously identify a fingerprint; and
    a controller configured to:
    receive a fingerprint-touch input through the display module and perform an operation on the mobile terminal corresponding to fingerprint information of the received fingerprint-touch input that matches with one of the stored plurality of fingerprint information,
    recognize the received fingerprint-touch input as an ordinary touch input and perform a predefined operation corresponding to a point of detection of the received fingerprint-touch input if the fingerprint information of the received fingerprint-touch input is determined not to match any of the plurality of fingerprint information stored in the memory, and control the display of the operation screen in accordance with a control value corresponding to the fingerprint information that matches with the fingerprint information of the received fingerprint-touch input, wherein the controller controlling the display of the operation screen comprises scrolling the operation screen at a speed corresponding to the control value, changing a playback speed of the operation screen to a speed corresponding to the control value and moving the operation screen by a distance corresponding to the control value.

11. The mobile terminal of claim 10, wherein the controller is further configured to search the stored plurality of the fingerprint information for the fingerprint information of the received fingerprint-touch input, and to extract the operation to be performed on the mobile terminal that corresponds with the searched fingerprint information of the received fingerprint-touch input.

12. The mobile terminal of claim 10, wherein the operation performed on the mobile terminal includes one of locking the mobile terminal, unlocking the mobile terminal, and temporarily unlocking the mobile terminal for a predetermined amount of time.

13. The mobile terminal of claim 10, wherein the operation performed on the mobile terminal includes one of locking all operating menus, locking only particular operating menus, unlocking only the particular operating menus and unlocking all operating menus.

14. The mobile terminal of claim 10, wherein the different operations to be performed on the mobile terminal stored in association with the plurality of fingerprint information include instructions for displaying different groups of menu icons.

15. The mobile terminal of claim 14, wherein the different groups of menu icons include menu icons representing operating system applications, menu icons representing downloaded applications, and menu icons representing user-preferred applications.

16. The mobile terminal of claim 10, wherein the operation performed on the mobile terminal includes playing a multimedia program on the mobile terminal at a predetermined playback speed corresponding to the fingerprint information of the received fingerprint-touch input that matches with one of the stored plurality of fingerprint information.

17. The mobile terminal of claim 10, further comprising:
an output unit configured to output an indicating event indicating the operation is being performed on the mobile terminal.

18. The mobile terminal of claim 10, wherein the received fingerprint-touch input includes one of 1) a fingerprint-touch input generated by touching the display module with a finger and dragging the finger in a predetermined direction, 2) a fingerprint-touch input generated by touching the display module with a finger and dragging the finger in a predetermined pattern, 3) a fingerprint-touch input generated by touching a first position on the display module with a finger and dragging the finger from the first position to a second position on the display module, 4) a fingerprint-touch input generated by touching the display module with pressure, and 5) a fingerprint-touch input generated by touching the display module for more than a predefined amount of time.

* * * * *